US008040571B2

(12) United States Patent
Yamamizu

(10) Patent No.: US 8,040,571 B2
(45) Date of Patent: Oct. 18, 2011

(54) IMAGE PROCESSING FOR EXTRACTING UNIQUE INFORMATION FROM REGION OF PAPER DETERMINED TO BE SUITABLE

(75) Inventor: Hiroshi Yamamizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 12/211,377

(22) Filed: Sep. 16, 2008

(65) Prior Publication Data

US 2009/0074301 A1 Mar. 19, 2009

(30) Foreign Application Priority Data

Sep. 19, 2007 (JP) ................................ 2007-242666

(51) Int. Cl.
*H04N 1/40* (2006.01)
*G06T 7/00* (2006.01)
*G06K 9/46* (2006.01)
*G06K 9/80* (2006.01)

(52) U.S. Cl. ....... 358/3.28; 358/406; 358/464; 382/100; 382/195

(58) Field of Classification Search .................. 358/1.9, 358/3.28, 406, 464; 382/100, 108, 135, 137, 382/192, 195; 283/72; 356/71; 340/5.86; 235/375, 487
See application file for complete search history.

(56) References Cited

U.S. PATENT DOCUMENTS

| | | | | |
|---|---|---|---|---|
| 5,354,097 | A * | 10/1994 | Tel | 283/72 |
| 5,992,601 | A * | 11/1999 | Mennie et al. | 382/135 |
| 6,973,196 | B2 * | 12/2005 | Patton et al. | 382/100 |
| 6,973,198 | B2 * | 12/2005 | Patton et al. | 382/100 |
| 7,333,629 | B2 * | 2/2008 | Patton et al. | 382/100 |
| 7,680,306 | B2 * | 3/2010 | Boutant et al. | 382/108 |
| 7,835,563 | B2 * | 11/2010 | Hampp | 382/135 |
| 7,891,565 | B2 * | 2/2011 | Pinchen et al. | 235/385 |
| 7,936,914 | B2 * | 5/2011 | Shimizu et al. | 382/135 |
| 2003/0219145 | A1 * | 11/2003 | Smith | 382/100 |

FOREIGN PATENT DOCUMENTS

JP 2005-38389 2/2005

* cited by examiner

*Primary Examiner* — Scott A Rogers
(74) *Attorney, Agent, or Firm* — Fizpatrick, Cella, Harper & Scinto

(57) ABSTRACT

The present invention provides a technique relating to image processing capable of searching for, from a surface of paper, a more suitable region for matching of paper fingerprint information or print paper surface unique information. Its configuration includes a region dividing section for dividing image data including a read out paper fingerprint into a plurality of regions; a section for obtaining variance of gradation values of pixels in the individual regions divided by the region dividing section; a deciding section for making a decision from each variance value obtained by the section for obtaining variance of gradation values as to whether a corresponding region is suitable for matching of the paper fingerprint information; and an extracting section for extracting the paper fingerprint information in the region decided by the deciding section.

11 Claims, 17 Drawing Sheets

IMAGE PROCESSING FOR EXTRACTING UNIQUE INFORMATION FROM REGION OF PAPER DETERMINED TO BE SUITABLE

BACKGROUND OF THE INVENTION

1. Field of the Invention

The present invention relates to an image processing apparatus capable of searching for a higher matching accuracy, optimum region on a paper surface at a time when verifying the authenticity of the paper on the basis of a paper fingerprint unique to the paper or the state of the paper surface due to irregular dispersion of toner produced at printing.

2. Description of Related Art

Paper consists of tangles of vegetable fibers of 20 to 30 microns thick. The tangles create a random pattern. The random pattern differs from paper to paper just as a fingerprint. Such a pattern due to unevenness and overlap of random fibers in paper surface is called a paper fingerprint.

In addition, as for a document printed by a printer, copying machine or the like, it is impossible to control up to the minute dispersion of toner particles used for forming an image. Thus, the minute dispersion of the toner becomes irregular. Accordingly, the state of the paper surface due to the irregular dispersion of the toner produced during printing is applicable as unique information formed on the printed paper surface (it is referred to as "print paper surface unique information" hereinbelow).

As described above, on the paper surface, there is a paper fingerprint different from paper to paper regardless of the presence or absence of printing, and the information unique to the printed paper surface created by printing. Accordingly, registering the information on the paper fingerprint different from paper to paper (referred to as "paper fingerprint information" hereinbelow) or the foregoing print paper surface unique information in terms of "the original I have issued is the paper having this paper fingerprint information" makes it possible to distinguish the "original" from a "counterfeit" afterward. The term "counterfeit" naturally includes a "copy of the original".

Incidentally, claim 6 of Japanese Patent Laid-Open No. 2005-038389 reads as follows.

"The authenticity deciding method characterized by setting to at least one of the reference data and the matching data a gradation value range that is estimated to include a noise component on the basis of gradation value distribution, and by calculating the correlation value after excluding data belonging to the set gradation value range."

Here, assume that a paper fingerprint information acquiring region or a print paper surface unique information obtaining region is set using the technique of Japanese Patent Laid-Open No. 2005-038389. Then, a pure white region is set as the paper fingerprint information acquiring region or print paper surface unique information obtaining region. However, there is a problem of being unable to make a decision as to whether that region is a region that gives the highest matching rate in the paper surface at a time when verifying the paper fingerprint information or print paper surface unique information.

SUMMARY OF THE INVENTION

The present invention is implemented to solve the foregoing problem. It is therefore an object of the present invention to provide a technique relating to image processing capable of searching for a region more appropriate for the matching of the paper fingerprint information or the print paper surface unique information on the paper surface.

To solve the foregoing problem, the present invention is configured as described below.

In the first aspect of the present invention, there is provided an image processing apparatus comprising: region dividing means for dividing image data including a read out paper fingerprint into a plurality of regions; means for obtaining variance of gradation values of pixels in individual regions divided by the region dividing means; deciding means for making a decision based on each variance value obtained by the means for obtaining variance of gradation values as to whether a corresponding region is suitable for matching of the paper fingerprint information; and extracting means for extracting the paper fingerprint information in the region that the deciding means decides is suitable.

In the second aspect of the present invention, there is provided an image processing apparatus comprising: region dividing means for dividing, into a plurality of regions, image data including read out unique information due to irregular dispersion of toner on a print paper surface; means for obtaining variance of gradation values of pixels in individual regions divided by the region dividing means; deciding means for making a decision based on each variance value obtained by the means for obtaining variance of gradation values as to whether a corresponding region is suitable for matching of the unique information; and extracting means for extracting the unique information in the region that the deciding means decides is suitable.

In the third aspect of the present invention, there is provided an image processing apparatus comprising: region dividing means for dividing, into a plurality of regions, image data including at least one of paper fingerprint information and read out unique information due to irregular dispersion of toner on a print paper surface; means for obtaining variance of gradation values of pixels in the individual regions divided by the region dividing means; deciding means for making a decision based on each variance value obtained by the means for obtaining variance of gradation values as to whether a corresponding region is suitable for matching of the at least one of the paper fingerprint information and the unique information; and extracting means for extracting the at least one of the paper fingerprint information and the unique information in the region that the deciding means decides is suitable.

In the fourth aspect of the present invention, there is provided an image processing method comprising the steps of: dividing image data including a read out paper fingerprint into a plurality of regions; obtaining variance of gradation values of pixels in individual regions divided in the step of dividing; making a decision based on each variance value obtained in the step of obtaining variance of gradation values as to whether a corresponding region is suitable for matching of the paper fingerprint information; and extracting the paper fingerprint information in the region decided to be suitable in the step of deciding.

In the fifth aspect of the present invention, there is provided an image processing method comprising the steps of: dividing, into a plurality of regions, an image including read out unique information due to irregular dispersion of toner on a print paper surface; obtaining variance of gradation values of pixels in individual regions divided in the step of dividing; making a decision based on each variance value obtained in the step of obtaining variance of the gradation values as to whether a corresponding region is suitable for matching of the unique information; and extracting the unique information in the region decided to be suitable in the step of deciding.

In the sixth aspect of the present invention, there is provided an image processing method comprising the steps of: dividing, into a plurality of regions, an image including at least one of paper fingerprint information and read out unique information due to irregular dispersion of toner on a print paper surface; obtaining variance of gradation values of pixels in individual regions divided in the step of dividing; making a decision based on each variance value obtained in the step of obtaining variance of the gradation values as to whether a corresponding region is suitable for matching of the at least one of the paper fingerprint information and the unique information; and extracting the at least one of the paper fingerprint information and the unique information in the region decided to be suitable in the step of deciding.

In the seventh aspect of the present invention, there is provided an computer readable storage medium which stores a program for causing a computer to execute the steps of: dividing image data including a read out paper fingerprint into a plurality of regions; obtaining variance of gradation values of pixels in individual regions divided in the step of dividing; making a decision based on each variance value obtained in the step of obtaining variance of gradation values as to whether a corresponding region is suitable for matching of the paper fingerprint information; and extracting the paper fingerprint information in the region decided to be suitable in the step of deciding.

In addition, the individual steps in each foregoing image processing method can be configured in the form of a program to be executed by a computer provided in various image processing apparatuses or information processing apparatuses. Then, it is possible to cause the computer to implement the image processing method by causing the computer to read the program. In addition, as for the program, it is possible to cause the computer to read it via a computer readable storage medium that records the program.

Incidentally, in the present specification, it is assumed that the image processing apparatus includes, besides a dedicated image processing apparatus and image forming apparatus, a general-purpose information processing apparatus capable of executing the processing in accordance with the present invention.

According to the present invention, it becomes possible, in the matching of the paper fingerprint information or the print paper surface unique information used for the authenticity verification, to find a region that has a higher matching rate and is more suitable for the registration and matching of the paper fingerprint information and/or the print paper surface unique information.

Further features of the present invention will become apparent from the following description of exemplary embodiments (with reference to the attached drawings).

DESCRIPTION OF THE EMBODIMENTS

The best mode for implementing the present invention will now be described with reference to the accompanying drawings.

First Embodiment

<Printing System>

First, the first embodiment in accordance with the present invention will be described in detail with reference to the accompanying drawings.

Figure 1:
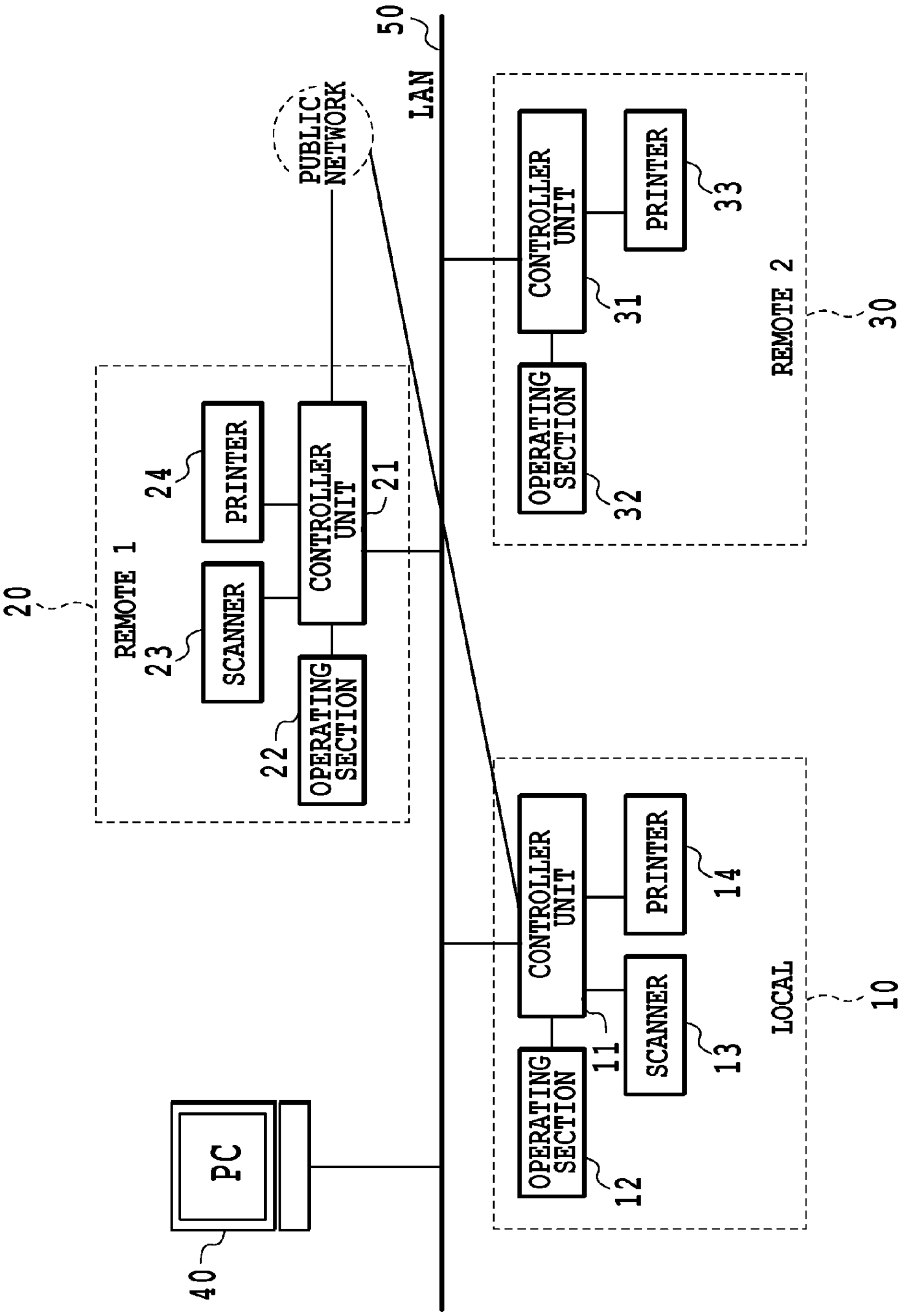
FIG. 1 is a block diagram showing an overall configuration of a printing system of a first embodiment in accordance with the present invention.

FIG. 1 is a block diagram showing an overall configuration of a printing system of the first embodiment.

In the printing system shown in FIG. 1, a host computer 40 and three image forming apparatuses (10, 20 and 30) are connected to a LAN 50. In the printing system in accordance with the present invention, however, they are not limited to these numbers connected. In addition, although a LAN is used as a connecting method between the apparatuses in the present embodiment, this is not essential. For example, it is also possible to use any networks such as a WAN (public network), any serial transmission systems such as USB, and any parallel transmission systems such as a Centronics interface and SCSI.

The host computer (called "PC" from now on) 40 has functions of a personal computer. The PC 40 can transmit and receive files via the LAN 50 or WAN using FTP or SMB protocol, and can transmit and receive e-mails. In addition, the PC 40 can issue a print instruction to the image forming apparatus 10, 20 or 30 via a printer driver.

As shown in FIG. 1, the image forming apparatuses 10 and 20 have the same configuration. In contrast, the image forming apparatus 30 has only printing functions without a scanner section which the image forming apparatus 10 or 20 possesses. In the following description, paying attention to only the image forming apparatus 10 of the image forming apparatuses 10 and 20, its configuration will be described in detail for the sake of simplicity.

<Image Forming Apparatus 10>

Figure 2:
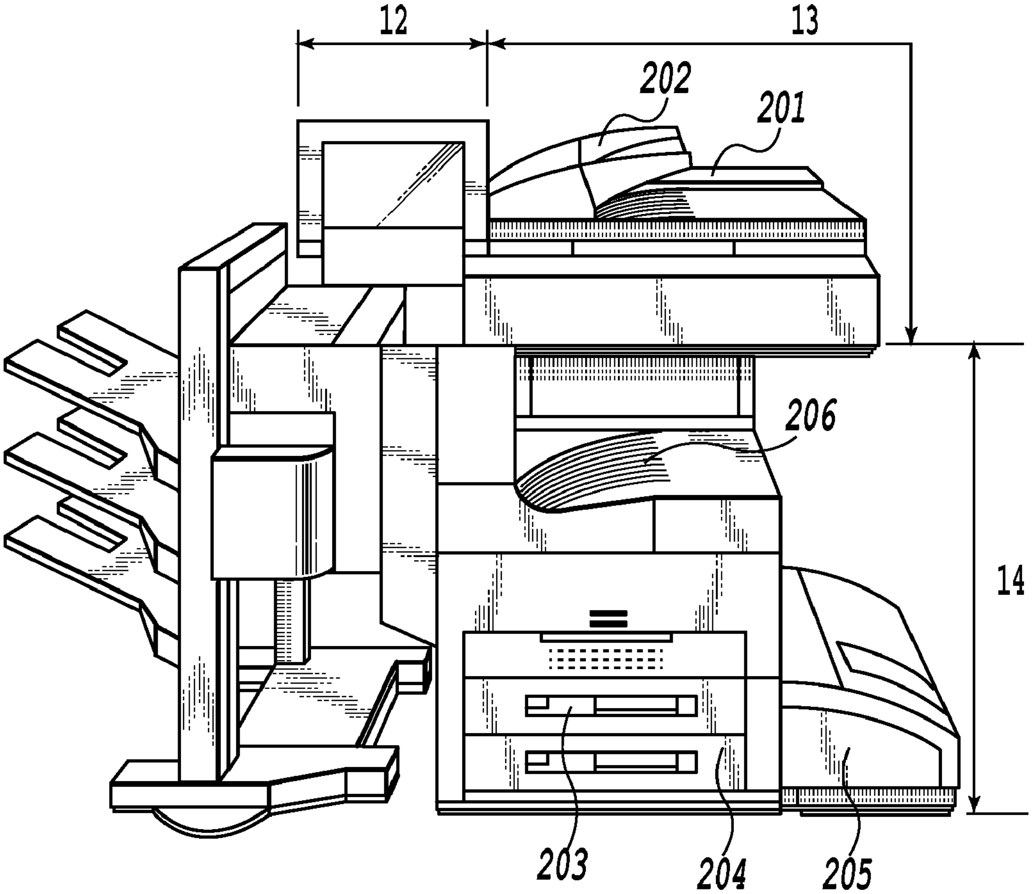
FIG. 2 is an external view of the image forming apparatus of the first embodiment in accordance with the present invention.

FIG. 2 shows an external appearance of the image forming apparatus 10.

The image forming apparatus 10 comprises a scanner section 13 which is one of image input devices, a printer section 14 which is one of image output devices, a controller 11 for controlling the operation of the image forming apparatus 10 in its entirety, and an operating section 12 serving as a user interface (UI).

The scanner section 13 has a plurality of CCDs. If the individual CCDs have different sensitivity from each other, even if the levels of the individual pixels on the source document are the same, the individual pixels are recognized as having different levels. Thus, to perform its correction, the scanner section 13 exposes a white board (uniformly white board) to light and scans it, first, converts the reflected light amount obtained by the exposure and scanning to an electric signal, and outputs it to the controller 11.

Incidentally, as will be described later, a shading correcting section 500 in the controller 11 recognizes the difference in the sensitivity of the individual CCDs from the electric signal obtained from the individual CCDs. Then, utilizing the difference in the recognized sensitivity, the shading correcting section 500 corrects the values of the electric signal obtained by scanning the image on the source document. In addition, in response to receiving gain adjustment information from a CPU 301 in the controller 11, which will be described later, the shading correcting section 500 carries out the gain adjustment in accordance with the information. The gain adjustment is used for adjusting how to allocate the values of the electric signal obtained by the exposure and scanning of the source document to luminance signal values 0-255. The gain adjustment makes it possible to convert the values of the electric signal obtained by the exposure and scanning of the source document to higher luminance signal values or to lower luminance signal values.

Subsequently, the operation of the scanner section 13 at a time when scanning an image on the source document will be described.

The scanner section 13 converts the image information to the electric signal by inputting to the CCDs the reflected light obtained by the exposure and scanning of the image on the source document. In addition, it converts the electric signal to luminance signals consisting of individual colors R, G and B, and outputs the luminance signals to the controller 11 as image data.

Incidentally, the source document is placed on a tray 202 of a source document feeder 201. When a user instructs to start reading via the operating section 12, the controller 11 provides the scanner section 13 with a source document read instruction. In response to receiving the instruction, the scanner section 13 feeds the source document one by one from the tray 202 of the source document feeder 201, and reads the source document. As to the reading method of the source document, the automatic feeding by the source document feeder 201 is not essential. For example, a method is also possible which places the source document on a surface of a glass plate not shown and moves an exposure portion to carry out scanning of the source document.

Next, as for the printer section 14, it is an image forming device for forming image data received from the controller 11 on printing paper. In the present embodiment, although the image forming system consists of an electrophotographic system using a photoconductive drum or a photoconductive belt, the present invention is not limited to it. For example, an ink-jet system is also applicable which expels inks from a minute nozzle array on printing paper to print. The printer section 14 includes a plurality of paper cassettes 203, 204, and 205, which enable selection of a different paper size or different paper direction. A paper output tray 206 receives printing paper after printing.

<Detailed Description of Controller 11>

Here, a configuration of the controller 11 of the image forming apparatus 10 will be described.

Figure 3:
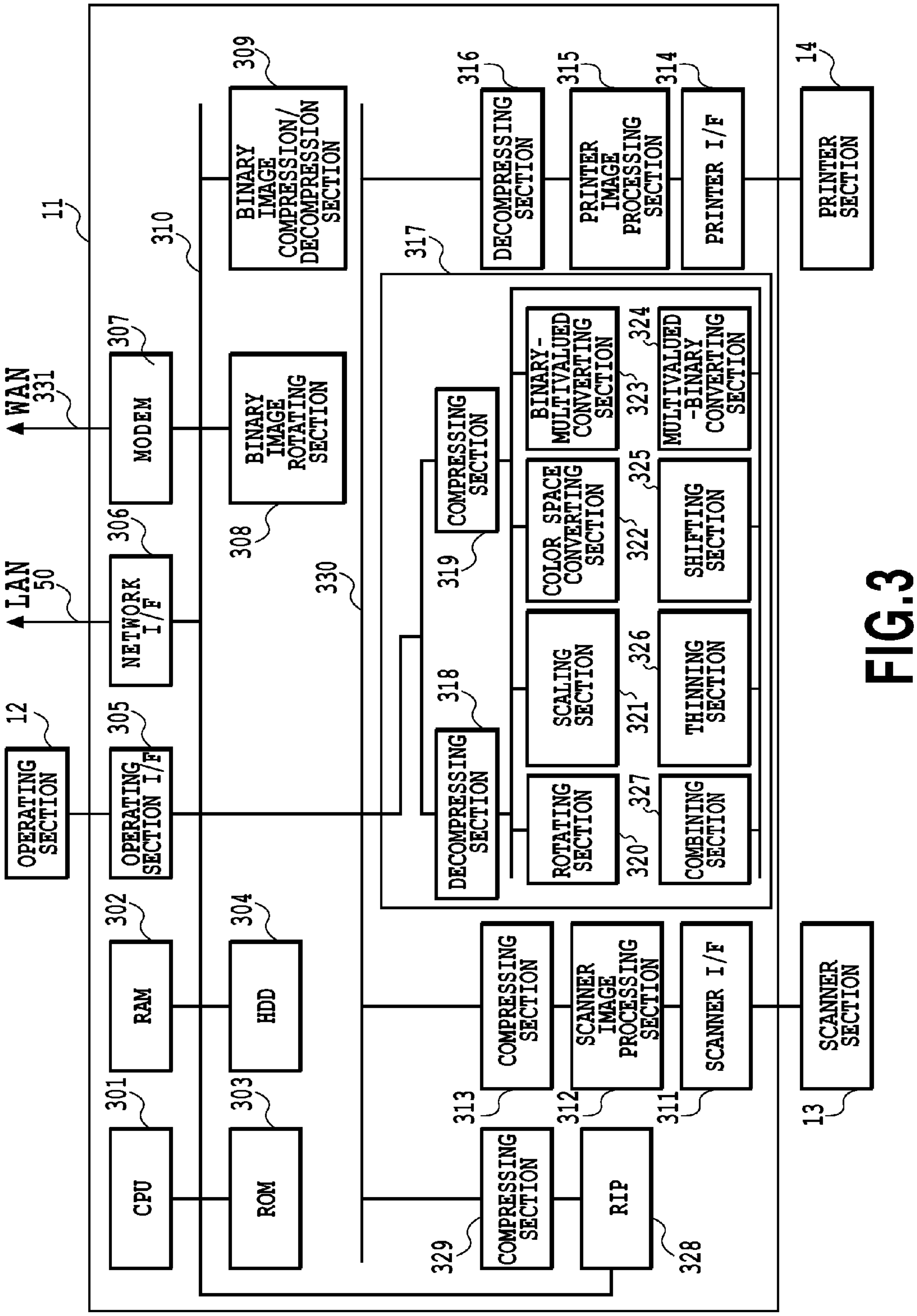
FIG. 3 is a block diagram showing a configuration of a controller 11 in the first embodiment in accordance with the present invention.

FIG. 3 is a block diagram for explaining the configuration of the controller 11 in more detail.

The controller 11 (control means) is electrically connected to the scanner section 13 and printer section 14 on one hand, and to the PC 40 or external apparatus via the LAN 50 or WAN 331 on the other hand. This enables the input and output of the image data and device information.

A CPU 301 achieves centralized control of accesses to individual devices connected thereto according to control programs and the like stored in a ROM 303, and centralized control of various processings carried out inside the controller 11. A RAM 302 is a system work memory for the CPU 301 to operate, and a memory for temporarily storing image data. The RAM 302 consists of an involatile SRAM that retains the stored contents after the power off and a DRAM whose contents are erased after the power off. The ROM 303 stores a boot program and the like of the apparatus. An HDD 304 is a hard disk drive capable of storing system software and image data.

An operating section I/F 305 is an interface for connecting a system bus 310 and the operating section 12. The operating section I/F 305 receives the image data to be displayed on the operating section 12 from the system bus 310 and supplies it to the operating section 12, and supplies the information input from the operating section 12 to the system bus 310.

A network I/F 306 is connected between the LAN 50 and the system bus 310, and performs input and output of information. A modem 307 is connected between the WAN 331 and the system bus 310, and performs input and output of information. A binary image rotating section 308 converts the direction of the image data before transmission. A binary image compression/decompression section 309 converts the resolution of the image data before transmission to a prescribed resolution or to a resolution matching the capacity of a party. The compression and decompression are carried out using a JBIG, MMR, MR or MH system. An image bus 331 is a transmission line for exchanging the image data, and consists of a PCI bus or IEEE 1394.

A scanner image processing section 312 carries out correction, modifying and editing of the image data received from the scanner section 13 via a scanner I/F 311. Besides, the scanner image processing section 312 makes a decision on whether the received image data is a color original document or a black-and-white original document, or a text original document or a photographic original document. Then, the scanner image processing section 312 attaches the decision result to the image data. Such accompanying information is referred to as attribute data. Details of the processing the scanner image processing section 312 performs will be described later.

Figure 4:
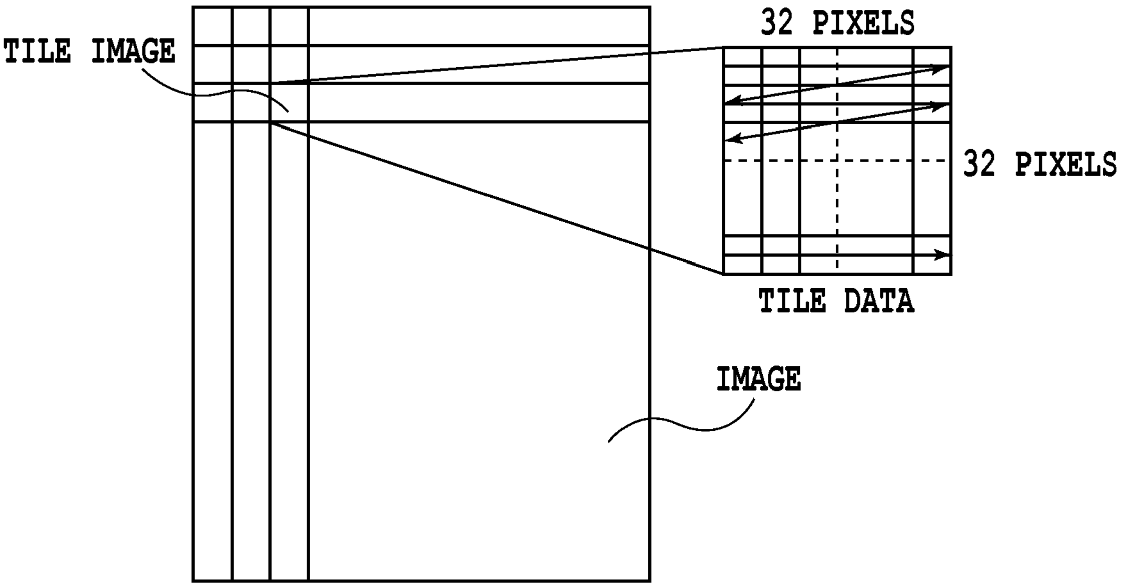
FIG. 4 is a schematic diagram showing tile data.

A compressing section 313 receives the image data, and divides the image data to blocks each consisting of 32 pixels× 32 pixels. Each 32×32 pixel image data is referred to as tile data. FIG. 4 schematically illustrates the tile data. On the source document (paper medium before read), each region corresponding to the tile data is referred to as a tile image. The average luminance information in the 32×32 pixel block and the coordinate position of the tile image on the source document are added to the tile data as header information. In addition, the compressing section 313 compresses the image data consisting of a plurality of tile data. A decompressing section 316 decompresses the image data consisting of a plurality of tile data, and then develops into a raster, and delivers it to a printer image processing section 315.

The printer image processing section 315 receives the image data delivered from the decompressing section 316, and performs image processing on the image data by referring to the attribute data annexed to the image data. The image data subjected to the image processing is supplied to the printer section 14 via a printer I/F 314. Details of the processing carried out by the printer image processing section 315 will be described later.

An image converting section 317 performs prescribed converting processing on the image data. The processing section comprises the following processing sections.

A decompressing section 318 decompresses the received image data. A compressing section 319 compresses the received image data. A rotating section 320 rotates the received image data. A scaling section 321 performs resolution converting processing of the received image data (such as from 600 dpi to 200 dpi). A color space converting section 322 converts the color space of the received image data. Using a prescribed converting matrix or table, the color space converting section 322 can carry out background color removal processing known to the public, LOG converting processing (RGB→CMY) known to the public, or output color correcting processing (CMY→CMYK) known to the public. A binary-multivalued converting section 323 converts received binary gradation image data to 256-step gradation image data. Conversely, a multivalued-binary converting section 324 converts received 256-step gradation image data to binary gradation image data by a technique such as error diffusion processing.

A combining section 327 combines two received image data to generate a piece of image data. To combine two image data, such a method is applied which uses the average value of the luminance values of the corresponding pixels to be combined as a composite luminance value, or which uses the luminance value higher in the luminance levels between the corresponding pixels as the luminance value of the pixels after the composition. In addition, a method of using darker pixels as the pixels after the composition is also possible. Furthermore, a method that determines the luminance value after the composition according to OR, AND or XOR operation between the pixels to be combined is also applicable. These combining methods are all well-known techniques. A thinning section 326 carries out resolution conversion by thinning out the pixels of the received image data, and generates image data with a resolution of ½, ¼, ⅛ and the like. A shifting section 325 gives a margin to the received image data or eliminates the margin.

An RIP 328 receives intermediate data generated from PDL code data transmitted from the PC 40 or the like, and generates (multivalued) bit map data. A compressing section 329 compresses the bit map data received from the RIP 328.

<Scanner Image Processing Section 312>

Next, details of the scanner image processing section 312 will be described with reference to FIG. 5.

Figure 5:
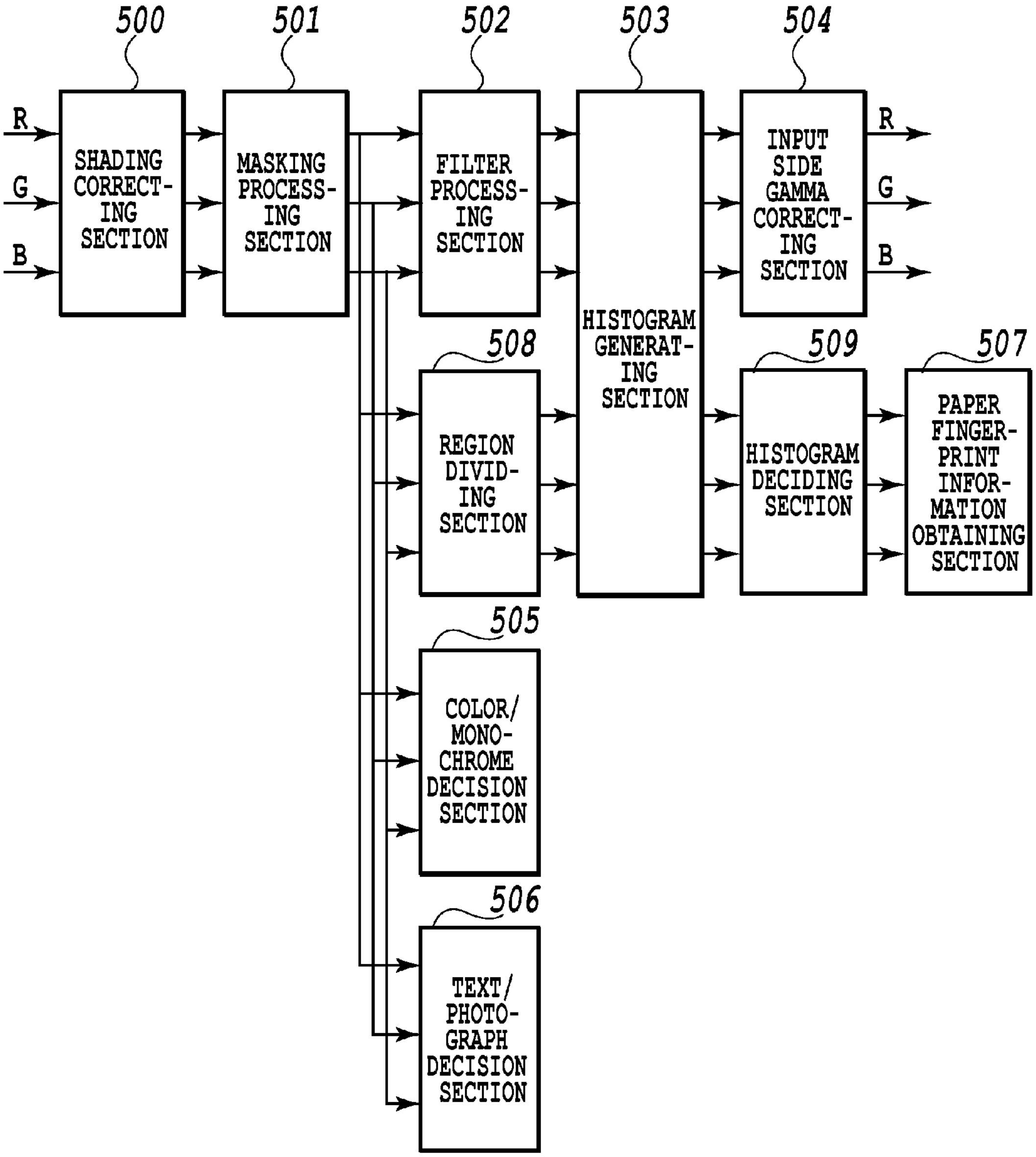
FIG. 5 is a block diagram showing a configuration of a scanner image processing section in the first embodiment in accordance with the present invention.

FIG. 5 shows an internal configuration of the scanner image processing section 312.

The scanner image processing section 312 receives the image data composed of RGB luminance signals each consisting of eight bits. A shading correcting section 500 carries out shading correction of the luminance signals. The term "shading correction" refers to processing for preventing erroneous recognition of the brightness of the source document because of the variations in the CCD sensitivity. Besides, as described above, the shading correcting section 500 is constructed in such a manner that it can carry out the gain adjustment in accordance with the instructions from the CPU 301.

Subsequently, the luminance signals are converted to standard luminance signals independent of the filter colors of the CCD by a masking processing section 501.

A filter processing section 502 arbitrarily corrects the spatial frequency of the received image data. The filter processing section 502 performs arithmetic processing on the received image data using a 7×7 matrix, for example. Incidentally, in a copying machine or multifunction machine, it is possible to select a text mode, a photographic mode or a text/photographic mode as a copy mode by pressing a tab 1504 in FIG. 15 which will be described later. When the user selects the text mode, the filter processing section 502 applies a filter for text to the entire image data. When the user selects the photographic mode, it applies a filter for photographs to all the image data. In addition, when the user selects the text/photographic mode, it adaptively switches the filter for each pixel in accordance with a text/photograph decision signal (part of the attribute data) which will be described later. Thus, a decision is made for each pixel on whether to apply the filter for photographs or for text. As for the filter for photographs, such a coefficient that enables smoothing of only high frequency components is set to prevent image roughness. On the other hand, as for the filter for text, such a coefficient that enables considerable edge emphasis is set to sharpen the text.

A histogram generating section 503 samples the luminance data of the individual pixels constituting the received image data. More specifically, it samples the luminance data in a rectangular region enclosed from a start point to an end point designated in the main scanning direction and subscanning direction at a fixed pitch in the main scanning direction and subscanning direction. Then, it generates the histogram data from the sampled results.

The histogram data generated from the image data delivered from the filter processing section 502 is used to estimate the background color level when carrying out the background color removal processing. The histogram data generated from the image data delivered from a region dividing section 508 which will be described later is used for making a decision by a histogram deciding section 509 which will be described later as to whether the image data in the divided region is suitable for the matching of the paper fingerprint information. An input side gamma correcting section 504 converts to luminance data having nonlinear characteristics by using a prescribed converting table or the like.

A color/monochrome decision section 505 decides on whether the individual pixels constituting the received image data are a chromatic color or an achromatic color, and annexes the decision results to the image data as a color/monochrome decision signal (part of the attribute data).

A text/photograph decision section 506 makes a decision on whether each pixel constituting the image data is a pixel constituting text, a pixel constituting a halftone dot, a pixel constituting text in halftone dots, or a pixel constituting a solid image from the pixel value of each pixel and pixel values of its neighboring pixels. The pixels that cannot be classified to any one of them are pixels constituting a white region. Then, the decision results are annexed to the image data as a text/photograph decision signal (part of the attribute data).

As for the plurality of regions obtained by dividing by the region dividing section 508 the RGB image data which are input from the shading correcting section 500 and are subjected to the processing of the masking processing section 501, a histogram deciding section 509 which will be described later decides a region suitable for a fingerprint information obtaining region. Then, a paper fingerprint information obtaining section 507 obtains the image data in the paper fingerprint information acquiring region decided. The detail of the paper fingerprint information obtaining processing will be described later with reference to FIG. 6, and a method of deciding the region suitable for the paper fingerprint information acquiring region will be described later with reference to FIG. 7 and FIG. 8.

The paper fingerprint information obtaining section 507 delivers the paper fingerprint information in the paper fingerprint information acquiring region to the RAM 302 through a data bus not shown.

The region dividing section 508 divides the image region of the image subjected to the masking processing into a plurality of regions. As for the size of the regions after the division, it can always be fixed, or may be controlled via a user interface of the operating section 12 or the like.

The histogram deciding section 509 makes a decision according to the histogram generated by the histogram generating section 503 as to whether a corresponding region is suitable for the matching of the paper fingerprint information in a manner as will be described later.

Here, the details will be described of the paper fingerprint information obtaining processing in the paper fingerprint information obtaining section 507.

Figure 6:
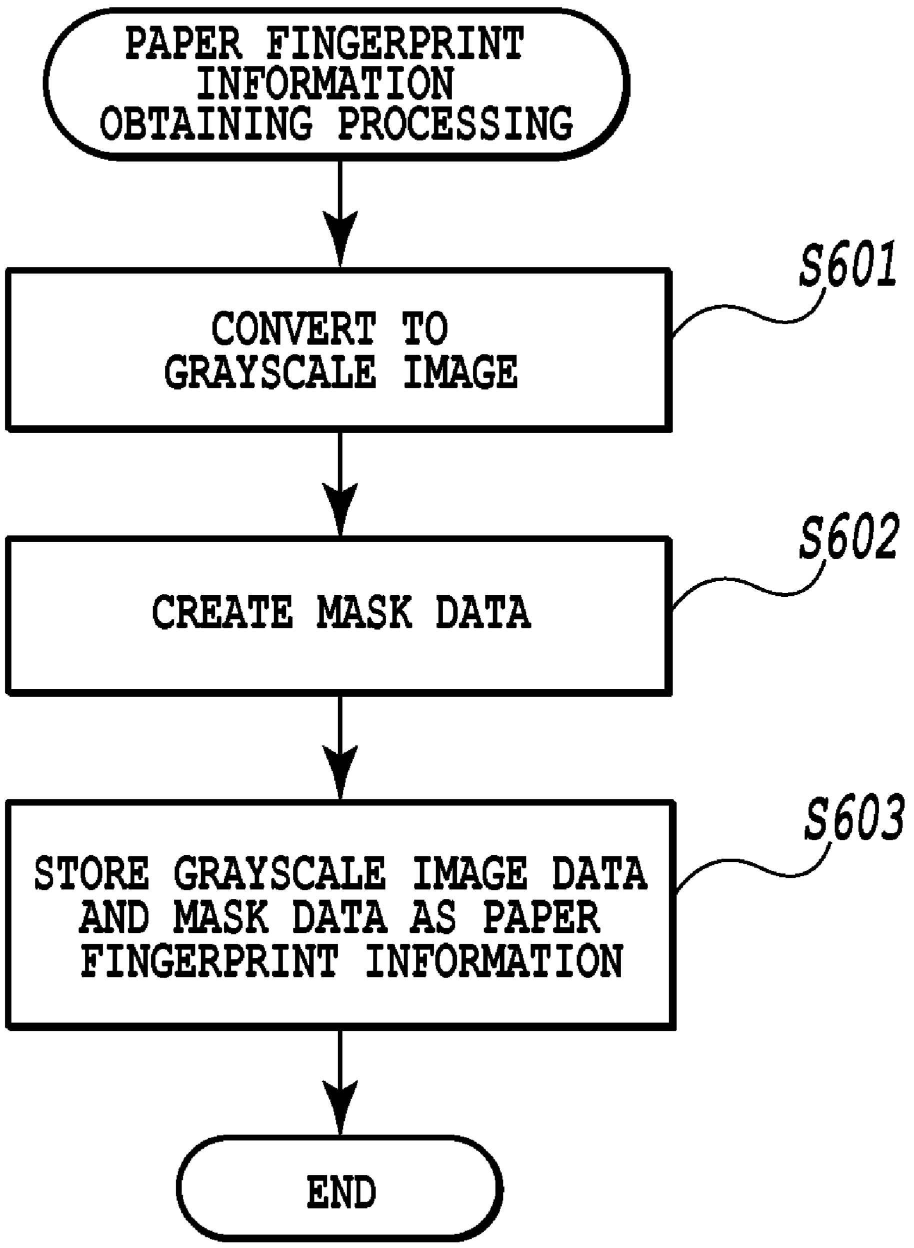
FIG. 6 is a flowchart showing paper fingerprint information obtaining processing executed by a paper fingerprint information obtaining section 507 of the first embodiment in accordance with the present invention.

FIG. 6 is a flowchart showing the paper fingerprint information obtaining processing which the paper fingerprint information obtaining section 507 executes.

At step 601, the paper fingerprint information obtaining section 507 converts the image data obtained by the section 507 to grayscale image data. Here, the image data is used of the paper fingerprint information acquiring region which is decided as being suitable for the matching of the paper fingerprint information by the histogram deciding section 509.

At step 602, the paper fingerprint information obtaining section 507 creates mask data for the matching by removing items that can cause an erroneous decision such as printing and handwritten characters from the image converted to the grayscale image data at step 601. The mask data is binary data consisting of "0" and "1". In the grayscale image data, as for pixels whose luminance signal values are equal to or greater than a first threshold (that is, a prescribed brightness level), the mask data values are set at "1". In addition, as for pixels whose luminance signal values are less than the first threshold, the mask data values are set at "0". The paper fingerprint information obtaining section 507 executes the foregoing processing for all the pixels in the grayscale image data.

At step 603, the paper fingerprint information obtaining section 507 obtains the two data, that is, the image data converted to the grayscale at step 601 and the mask data created at step 602, as the paper fingerprint information. Incidentally, although the image data itself which is converted to the grayscale at step 601 is sometimes called "paper fingerprint information", in the present embodiment, the set of the two data is referred to as "paper fingerprint information".

The above was the detailed description of the paper fingerprint information obtaining processing.

Next, a method of deciding the region suitable as the paper fingerprint information acquiring region will be described.

Figure 7:
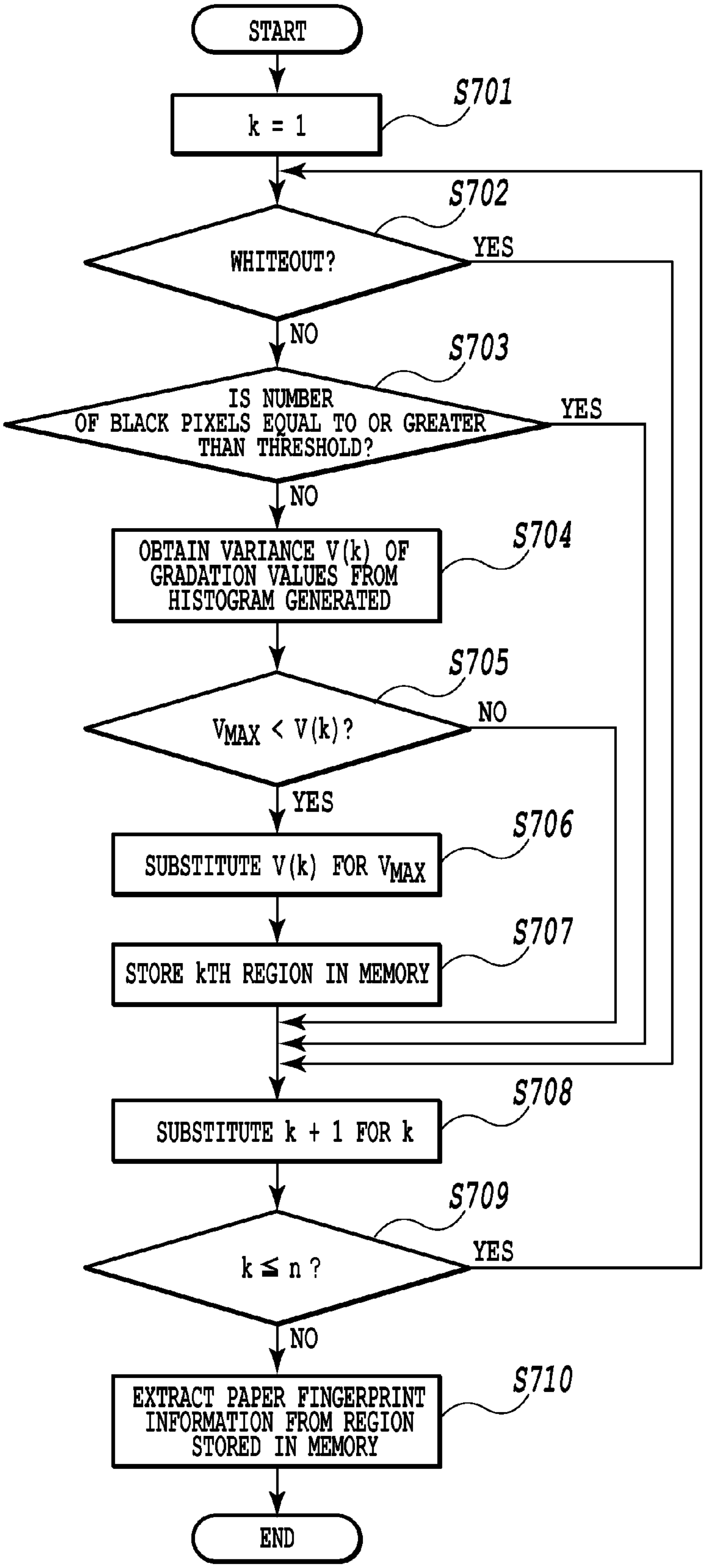
FIG. 7 is a flowchart showing processing executed by a histogram deciding section in the first embodiment in accordance with the present invention.

FIG. 7 is a flowchart showing the processing which the histogram deciding section 509 executes for making a decision from the histogram as to whether a region is suitable for the matching of the paper fingerprint information.

At step 701, k that designates the region number is initialized (k=1) for making a decision of the variance beginning from the histogram of a first region divided by the region dividing section 508.

At step 702, a decision is made as to whether the kth region includes a white level pixel (for example, (R, G, B)=(255, 255, 255)), that is, makes whiteout. If the kth region includes a white level pixel, a decision is made that the region is unsuitable for the matching of the paper fingerprint information, and the processing proceeds to step 708.

At step 703, a decision is made on whether the kth region includes pixels with a level equal to or less than a predetermined color level (a prescribed gradation value), that is, pixels constituting a character or picture in black or the like in the region, by the number equal to or greater than a prescribed threshold. If the number of the black pixels is equal to or greater than the threshold, a decision is made that the region is unsuitable for the matching of the paper fingerprint information, and the processing proceeds to step 708.

At step 704, the variance (variance value) of the gradation values of all the pixels in the region is obtained from the histogram generated by the histogram generating section 503. The greater the variance is, the greater the difference between the images in two regions will be when the paper fingerprint information of the region is compared with that of another region. Thus, the region with the greater variance is considered to be more suitable for the matching of the paper fingerprint information. Accordingly, the region with the greater variance is considered as the paper fingerprint information acquiring region.

At step 705, the kth variance V(k) obtained at step 704 is compared with the maximum value $V_{MAX}$ of the variances up to the (k−1)th region. The variance in each region is obtained by the following expression (1). Here, the gradation values are gradation values of individual pixels in the region, the average of the gradation values is the average of the gradation values of all the pixels in the region, and the number of pixels is the number of pixels in the region.

$$\text{variance}=\text{sum total of }((\text{gradation values}-\text{average of gradation values})^2)\div\text{number of pixels} \quad (1)$$

If $V_{MAX} \geqq V(k)$, the processing proceeds to step 708, and if $V_{MAX} < V(k)$, the processing proceeds to step 706.

Here, examples of the histogram generated by the histogram generating section 503 are shown in FIG. 8A-FIG. 8D, in which the horizontal axis represents an image density level and the vertical axis represents the number of sampled data.

Figure 8A:
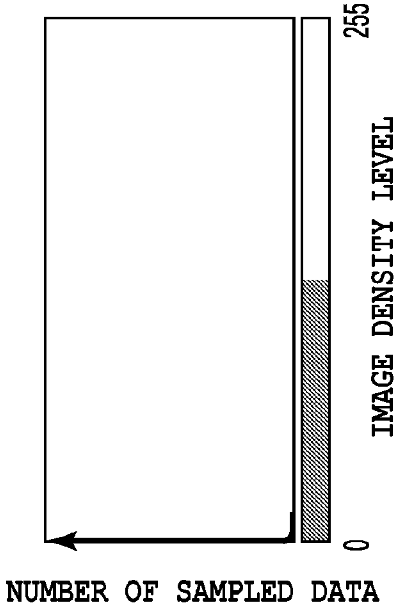
FIG. 8A is an example of a histogram when a region is almost black.
Figure 8B:
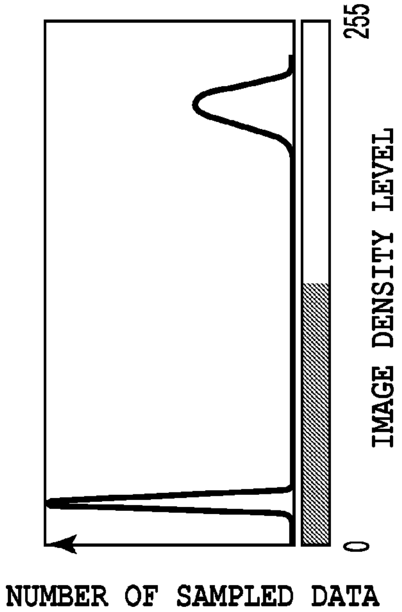
FIG. 8B is that when many pixels in the region have color levels under a threshold.

FIG. 8A shows a histogram in the case where the region in which the histogram is generated is almost covered with black. FIG. 8B shows a histogram in the case where the region in which the histogram is generated includes a lot of pixels whose color levels are equal to or less than the prescribed threshold. If the generated histogram is in the conditions as shown in FIG. 8A or FIG. 8B, the region is removed at step 703 of FIG. 7 as unsuitable for obtaining the paper fingerprint information.

Figure 8C:
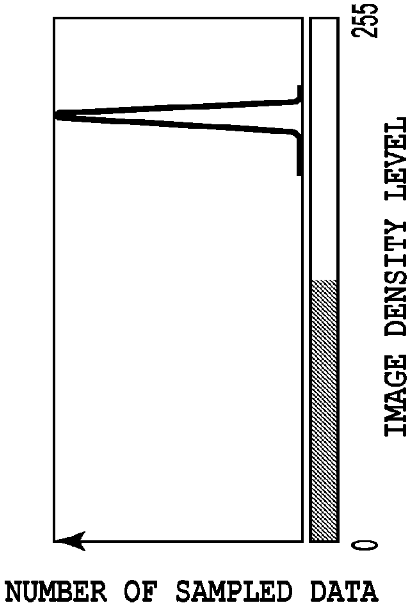
FIG. 8C and FIG. 8D are that when almost all pixels in the region have color levels higher than the threshold and the paper surface has no print or dust.
Figure 8D:
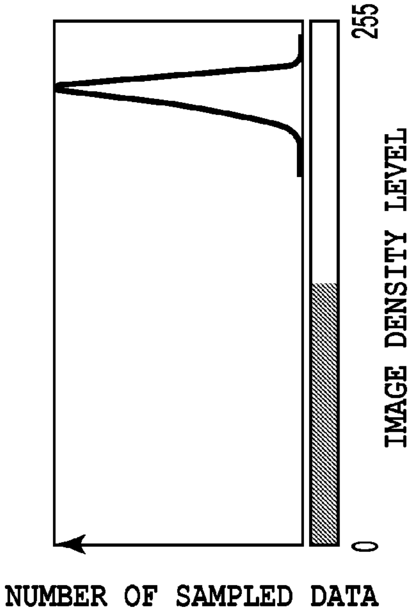

FIG. 8C and FIG. 8D each show a histogram in the case where almost all the pixels in the region in which the histogram is generated have color levels equal to or greater than the prescribed gradation value which becomes the threshold, and where no print or dust are present on the paper surface. Comparing FIG. 8C with FIG. 8D, it is found that FIG. 8D has a histogram broader in its distribution, thereby having a greater variance of the gradation values. Accordingly, when obtaining the paper fingerprint information from the four type of regions, the region of FIG. 8D is used as the paper fingerprint information acquiring region for the registration and matching of the paper fingerprint information. Although the variance is mentioned as an example, a standard deviation or the like can also be used.

Here, let us return the subject to the processing of FIG. 7. At step 706, V(k) on which the decision of $V_{MAX}<V(k)$ is made at step 705 is substituted for $V_{MAX}$.

At step 707, the image data of the kth region is stored in a memory.

At step 708, to decide the variance from the histogram of the next region, k+1 is substituted for k.

At step 709, a decision is made as to whether the new k which has been replaced by k+1 at step 708 is greater than the number of divided regions n. If the decision of $k \leqq n$ is made at step 709, the processing returns to step 702. Otherwise, it proceeds to step 710.

At step 710, the image data of the region stored in the memory in the end is delivered to the paper fingerprint information obtaining section 507, and then the paper fingerprint information obtaining section 507 extracts the paper fingerprint information of the region.

<Printer Image Processing Section 315>

Next, the processing in the printer image processing section 315 will be described in detail with reference to FIG. 9.

Figure 9:
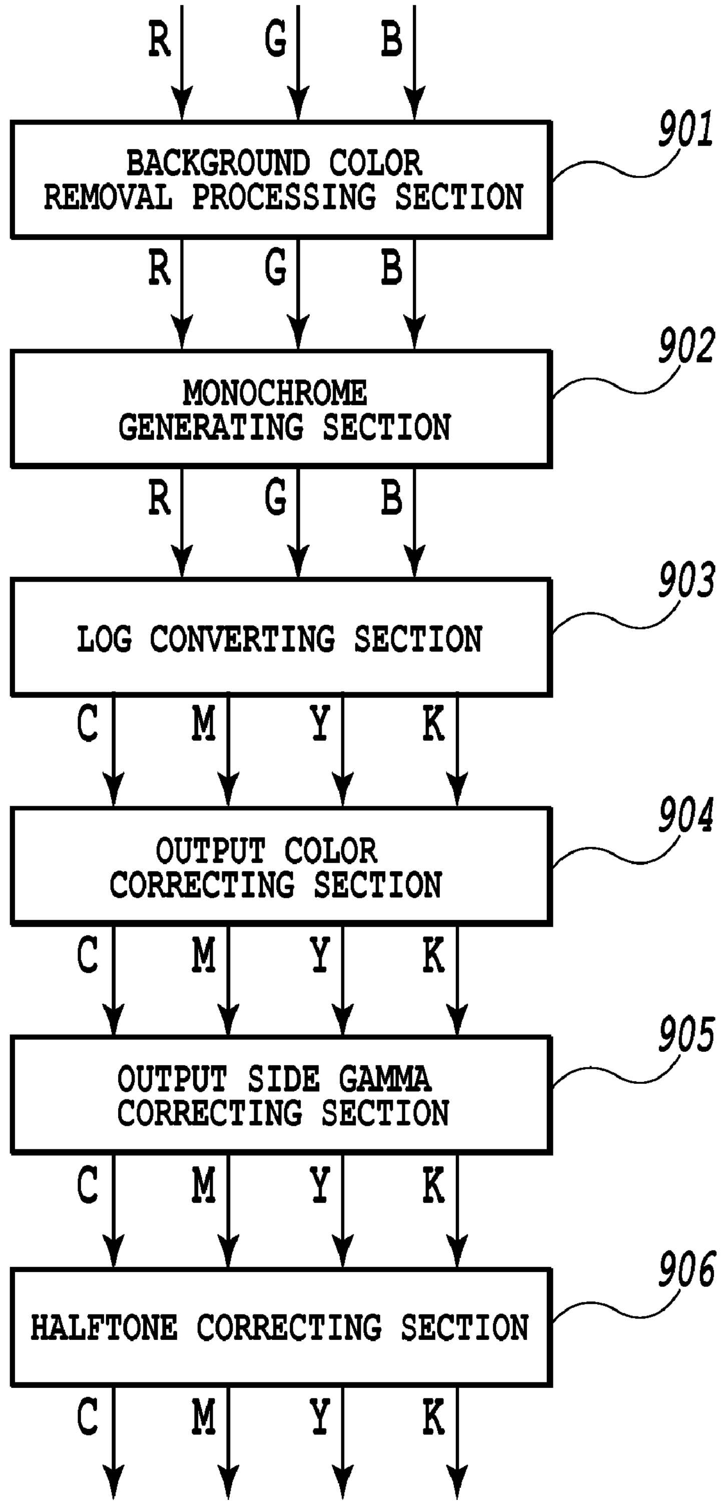
FIG. 9 is a block diagram for describing a flow of the processing in a printer image processing section in the first embodiment in accordance with the present invention.

FIG. 9 is a block diagram for describing a flow of the processing executed by the printer image processing section 315.

A background color removal processing section 901 removes the background color of the image data by using the histogram generated by the scanner image processing section 312. A monochrome generating section 902 converts the color data to the monochrome data. A Log converting section 903 carries out luminance density conversion. The Log converting section 903 converts the input RGB image data to CMY image data, for example.

An output color correcting section 904 carries out output color correction. For example, the output color correcting section 904 converts the input CMY image data to CMYK image data by using a prescribed converting table or matrix. An output side gamma correcting section 905 carries out correction in such a manner that the reflection density value after the copy output is proportional to the signal value input to the output side gamma correcting section 905. A halftone correcting section 906 performs halftone processing in accordance with the gradation number of the output printer section. For example, as for the received high gradient image data, the halftone correcting section 906 carries out digitization to two levels or 32 levels.

Incidentally, the individual processing sections in the scanner image processing section 312 or in the printer image processing section 315 can output the received image data without adding any individual processings. To pass the data through without adding any processing in the processing section is also referred to as "through the processing section".

Next, the paper fingerprint information registration processing and paper fingerprint matching processing in the present embodiment will be described in detail.

<Paper Fingerprint Information Registration Processing>

Concerning the paper fingerprint information registration processing, the CPU 301 can read the paper fingerprint information of the designated region (paper fingerprint information acquiring region) delivered from the paper fingerprint information obtaining section 507 to the RAM 302, and can register the paper fingerprint information read in a server not shown. The registration is made by executing the program stored in the RAM 302.

<Paper Fingerprint Matching Processing>

Concerning the paper fingerprint matching processing, the CPU 301 can read the paper fingerprint information delivered from the paper fingerprint obtaining section 507 to the RAM 302, and can control in such a manner as to compare the read paper fingerprint information with the other paper fingerprint information. Here, the other paper fingerprint information refers to the paper fingerprint information that has been registered in the server not shown by the paper fingerprint information registration processing in the present embodiment.

Figure 10:
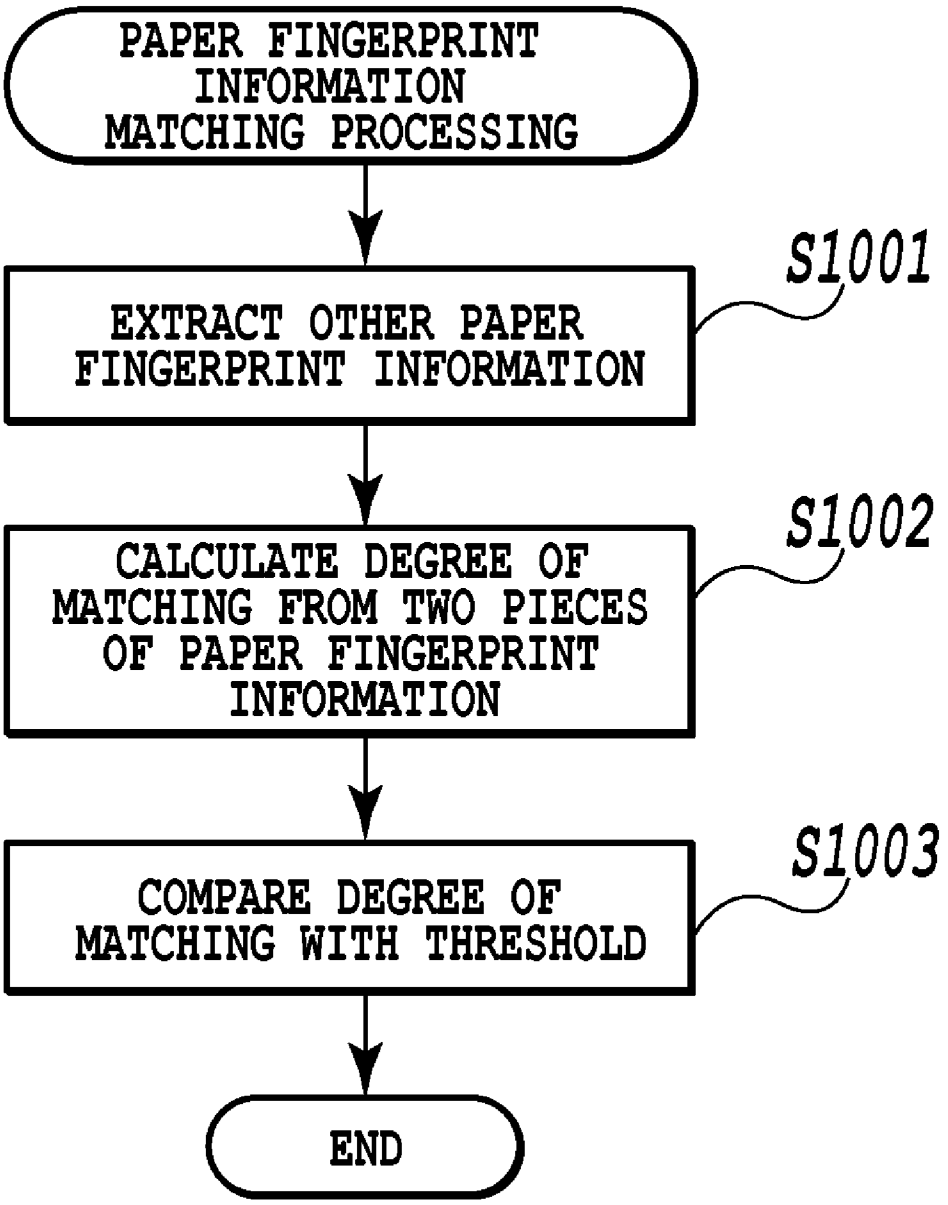
FIG. 10 is a flowchart describing the paper fingerprint information matching processing in the first embodiment in accordance with the present invention.

FIG. 10 is a flowchart showing the paper fingerprint information matching processing. Each step of the flowchart is controlled by the CPU 301 generally.

First, at step 1001, the paper fingerprint information registered in the server is fetched from the RAM 302.

At step 1002, the paper fingerprint information delivered from the paper fingerprint information obtaining section 507 (that is, the paper fingerprint information read just now) is compared with the paper fingerprint information fetched at the foregoing step 1001 (that is, the paper fingerprint information recorded in the server). In other words, the degree of matching is calculated from the two pieces of the paper fingerprint information. At the matching, since it is probable that the registered paper fingerprint information and the extracted paper fingerprint information are obtained from different positions, positional discrepancy correction is performed. The positional discrepancy correction is carried out by the following method.

<Positional Discrepancy Correction>

First, using the following expression (2), error values E(i, j) between the two pieces of the paper fingerprint information, that is, the error values when the positions of the two pieces of the paper fingerprint information are shifted by (i, j) are obtained by the number of (2n−1)×(2m−1). Details thereof are as follows. Here, n and m are the number of pixels in the lateral and vertical directions of the paper fingerprint information obtained from the paper fingerprint information acquiring region, respectively. In addition, in the following expression, x=1 to n, y=1 to m, and Σ means to take the sum total with respect to all x and y.

$$E(i,j)=\frac{\sum_{x,y}\alpha_1(x,y)\alpha_2(x-i,y-j)\{f_1(x,y)-f_2(x-i,y-j)\}2}{\sum_{x,y}\alpha_1(x,y)\alpha_2(x-i,y-j)} \quad (2)$$

In the foregoing expression (2), $\alpha_1$ is the mask data in the paper fingerprint information fetched at step 1001 (that is, the registered paper fingerprint information), and $f_1$ is the grayscale image data in the paper fingerprint information fetched at step 1001 (the registered paper fingerprint information). Likewise, $\alpha_2$ is the mask data in the paper fingerprint information delivered from the paper fingerprint information obtaining section 507 at step 1002 (the paper fingerprint information obtained just now), and $f_2$ is the grayscale image data in the paper fingerprint information delivered from the paper fingerprint information obtaining section 507 at step 1002 (the paper fingerprint information obtained just now).

Figure 11A:
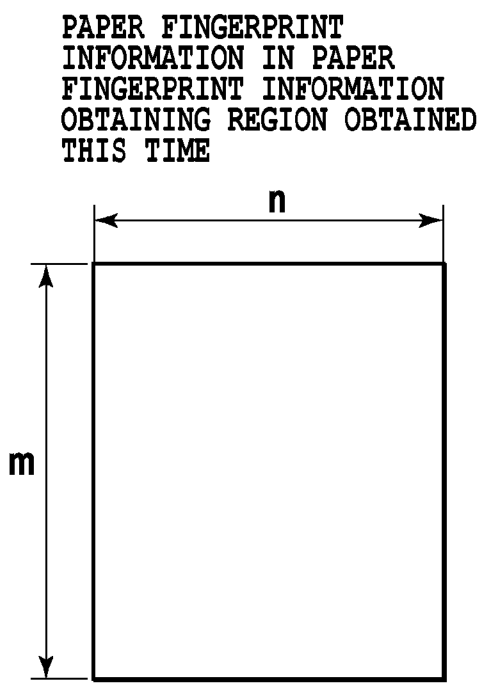
FIG. 11A is a diagram showing the paper fingerprint information obtained at this time.
Figure 11B:
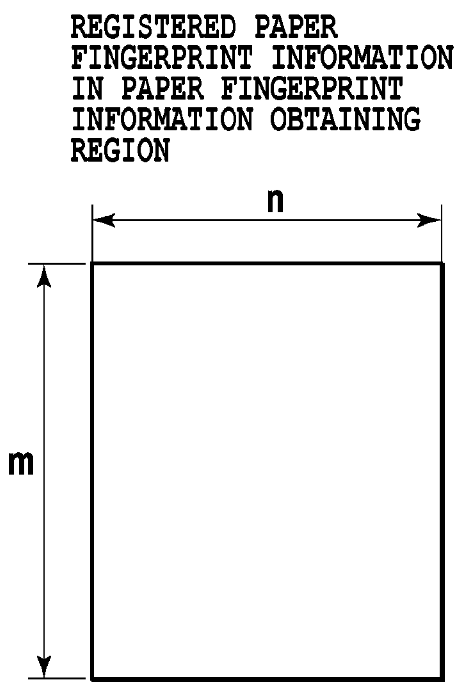
FIG. 11B is a diagram showing the paper fingerprint information that has been registered already.

Here, a concrete method will be described with reference to FIG. 11A-FIG. 11B, FIG. 12A-FIG. 12D, FIG. 13A-FIG. 13B, and FIG. 14A-FIG. 14B. FIG. 11A and FIG. 11B are each a schematic diagram of the paper fingerprint information of the paper fingerprint information acquiring region obtained at this time, and the paper fingerprint information of the registered paper fingerprint information acquiring region. Each of them is assumed to be composed of image data with m pixels long by n pixels wide.

In the function given by expression (2), $(2n-1)\times(2m-1)$ error values E(i, j) of the registered paper fingerprint information and of the paper fingerprint information just obtained at this time are obtained while shifting i, j pixel by pixel in the range of $-n+1$ to $n-1$ and $-m+1$ to $m-1$. In other words, E $(-n+1, -m+1)$ to E $(n-1, m-1)$ are obtained.

Figure 12A:
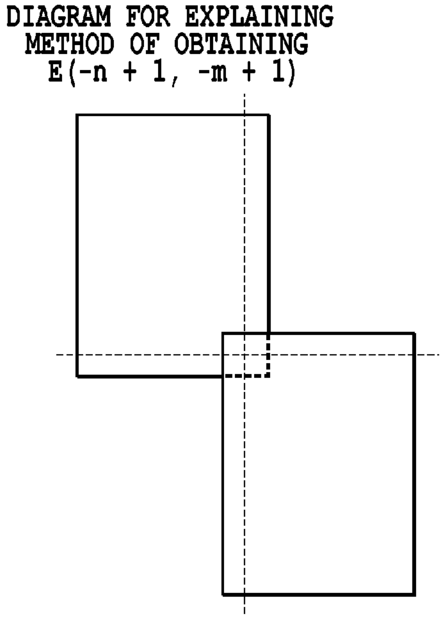
FIG. 12A is a diagram for explaining a method of obtaining E (−n+1, −m+1)
Figure 12B:
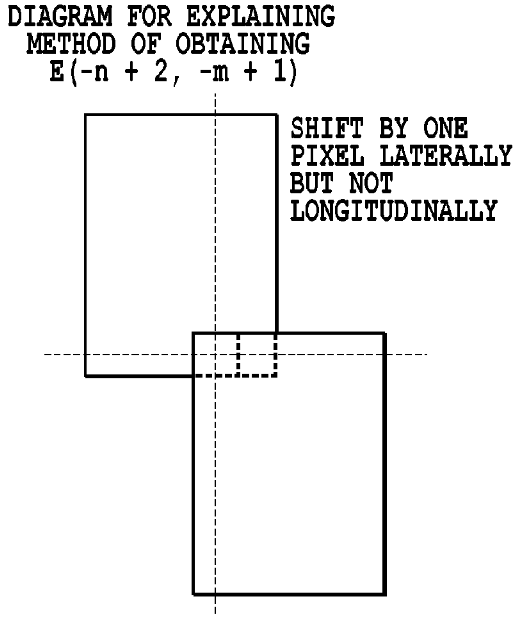
FIG. 12B is that of obtaining E (−n+2, −m+1)

FIG. 12A is a schematic diagram showing a state in which the pixel in the upper left corner of the registered paper fingerprint information and the pixel in the bottom right corner of the paper fingerprint information obtained at this time overlap. In this state, the value obtained according to expression (2) is E $(-n+1, -m+1)$. FIG. 12B is a schematic diagram showing a state in which the paper fingerprint information obtained at this time is shifted to the right by one pixel as compared with FIG. 12A. In this state, the value obtained according to expression (2) is E $(-n+2, -m+1)$. In the same manner, the calculation is continued while shifting the paper fingerprint information just obtained at this time.

Figure 12C:
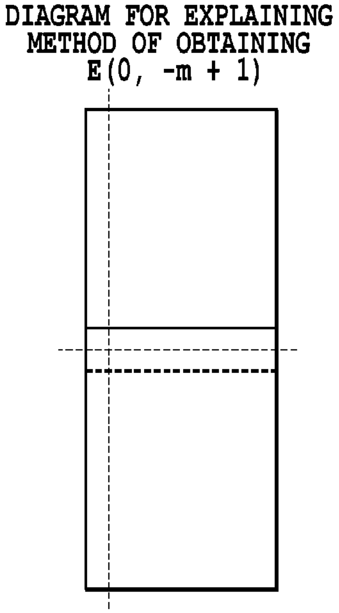
FIG. 12C is that of obtaining E (0, −m+1), and FIG. 12D that of obtaining E (n−1, −m+1)
Figure 12D:
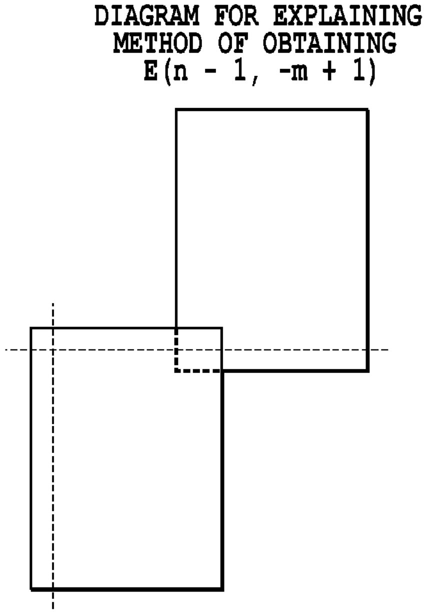

In FIG. 12C, the paper fingerprint information just obtained at this time is shifted to the position where it agrees with the registered paper fingerprint information at the left and right edges, thereby giving E $(0, -m+1)$. In addition, in FIG. 12D, the left edge of the paper fingerprint information obtained at this time is shifted to the right edge of the registered paper fingerprint information to obtain E $(n-1, -m+1)$. Thus shifting in the lateral direction increases i in E(i, j) one by one.

Figure 13A:
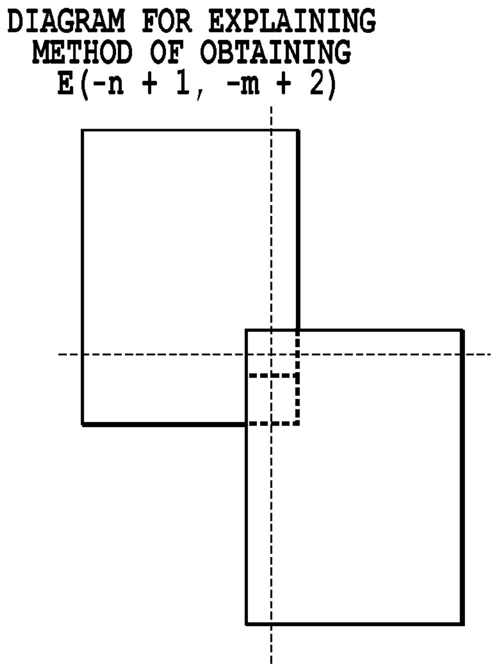
FIG. 13A is a diagram for explaining a method of obtaining E (−n+1, −m+2)
Figure 13B:
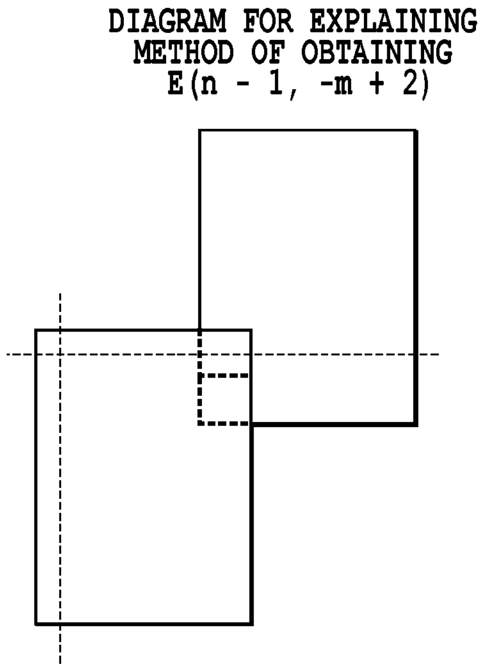
FIG. 13B is a diagram for explaining a method of obtaining E (n−1, −m+2)

Likewise, in FIG. 13A, the paper fingerprint information obtained at this time is shifted downward by one pixel in the vertical direction as compared with the FIG. 12A to obtain the value of $E(-n+1, -m+2)$. In addition, in FIG. 13B, the paper fingerprint information obtained at this time is shifted to the right edge of the registered paper fingerprint information as compared with FIG. 13A to obtain the value of E $(n-1, -m+2)$.

Figure 14A:
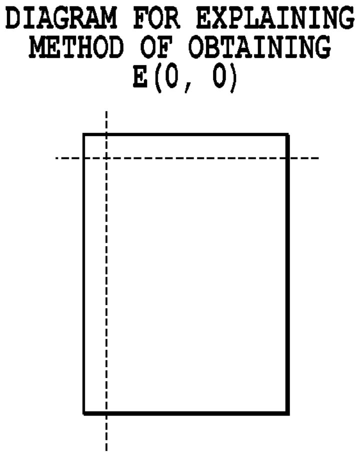
FIG. 14A is a diagram for explaining a method of obtaining E (0, 0)

FIG. 14A shows a state in which the registered paper fingerprint information and the paper fingerprint information obtained at this time occupy the same position, that is, fit perfectly. The value of E(i, j) at this time is denoted as E(0, 0).

Figure 14B:
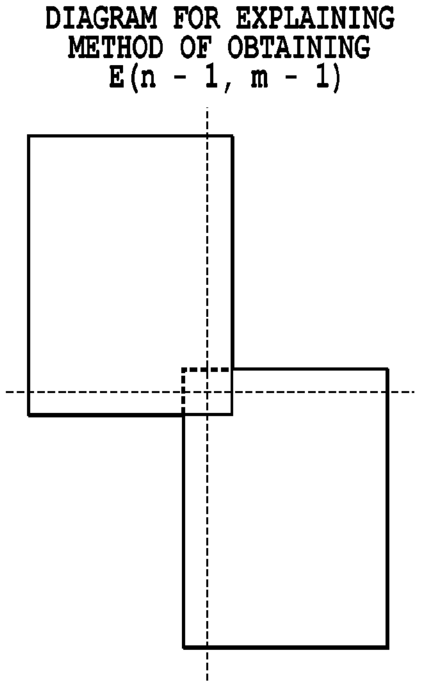
FIG. 14B is a diagram for explaining a method of obtaining E (n−1, m−1)

In the same manner as described above, the calculation is carried out while shifting the two pieces of the paper fingerprint information in such a manner that they overlap at least one pixel. Finally, the error value $E(n-1, m-1)$ is obtained when the pixel in the bottom right corner of the registered paper fingerprint information and the pixel in the upper left corner of the paper fingerprint information obtained at this time overlap as shown in FIG. 14B. In this way, a set of $(2n-1)\times(2m-1)$ error values E(i, j) is obtained.

Here, to understand the meaning of expression (2), let us consider the case where i=0 and j=0, and $\alpha_1$ (x, y)=1 (where x=1 to n, y=1 to m) and $\alpha_2$ (x−i, y−j)=1 (where x=1 to n, y=1 to m). In other words, let us obtain E(0, 0) when $\alpha_1$ (x, y)=1 (where x=1 to n, y=1 to m) and $\alpha_2$ (x−i, y−j)=1 (where x=1 to n, y=1 to m). Incidentally, the state i=0 and j=0 indicates that as shown FIG. 14A, the registered paper fingerprint information and the paper fingerprint information obtained at this time have the same position (fit perfectly).

Here, $\alpha_1$ (x, y)=1 (where x=1 to n, y=1 to m) indicates that all the pixels in the registered paper fingerprint information are bright. In other words, when the registered paper fingerprint information is obtained, there are no color materials such as toner and ink, or dust on the paper fingerprint obtaining region.

In addition, $\alpha_2$ (x−i, y−j)=1 (where x=1 to n, y=1 to m) indicates that all the pixels of the paper fingerprint information obtained at this time are bright. In other words, when the paper fingerprint information obtained just at this time is obtained, there are no color materials such as toner and ink, or dust on the paper fingerprint obtaining region.

Thus, when $\alpha_1$ (x, y)=1 and $\alpha_2$ (x−i, y−j)=1 hold for all the pixels, the foregoing expression (2) takes the form of $E(0, 0)=\{f_1(x, y)-f_2(x, y)\}^2/(n\times m)$.

The term $\{f_1(x, y)-f_2(x, y)\}^2$ denotes a square of the difference between the grayscale image data in the registered paper fingerprint information and the grayscale image data in the paper fingerprint information obtained just at this time. Accordingly, expression (2) at this time is proportional to the sum of squares of the differences between the individual pixels of the two pieces of the paper fingerprint information. Thus, E (0, 0) takes a smaller value as the number of pixels having similar $f_1$ (x, y) and $f_2$ (x, y) increases.

Although the foregoing is a method of obtaining E(0, 0), other E(i, j) are obtained in the same manner. Thus, as the number of pixels having similar $f_1$ (x, y) and $f_2$ (x, y) increases, E(i, j) take smaller values. Accordingly, it is found that when $E(k, l)=\min\{E(i, j)\}$, the position at which the registered paper fingerprint information is obtained and the position at which the paper fingerprint information obtained just at this time is obtained are shifted by k, l from one another.

<Meaning of α>

The numerator of expression (2) means results of multiplying $\{f_1(x, y)-f_2(x-i, y-j)\}^2$ by $\alpha_1$ and $\alpha_2$ (more precisely, the sum total of them are obtained by the operator Σ). As for these $\alpha_1$ and $\alpha_2$, highly colored pixels assume 0, and lightly colored pixels assume 1.

Accordingly, if one of (or both of) $\alpha_1$ and $\alpha_2$ is zero, the term $\alpha_1\alpha_2\{f_1(x, y)-f_2(x-i, y-j)\}^2$ becomes zero.

Thus, it is shown that if the target pixel of one of (or both of) the paper fingerprint information is highly colored, the difference in the density of the pixel is not taken into account. The reason for this is to neglect pixels on which dust or color materials are put.

In this processing, since the number of terms to be added up by the operator Σ varies, expression (2) is normalized by dividing it by the sum total $\Sigma\,\alpha_1(x, y)\,\alpha_2(x-i, y-j)$. Incidentally, the error value E(i, j) in which the denominator of expression (2), $\Sigma\,\alpha_1(x, y)\,\alpha_2(x-i, y-j)$, becomes zero is excluded from the set $\{E(-(n-1), -(m-1)), \ldots, E(n-1, m-1)\}$ of the error values which will be described later.

<Matching Degree Deciding Method>

As described above, when $E(k, l)=\min\{E(i, j)\}$ holds, it is found that the position of obtaining the registered paper fingerprint information and the position of obtaining the paper fingerprint information obtained just now are shifted by k, l from one another.

Next, a value indicating the level of similarity between the two pieces of the paper fingerprint information (the value is referred to as "matching degree") is obtained using E(k, l) and other E(i, j).

(A) First, from a set of the error values obtained by expression (2) (such as E(0, 0)=10*, E(0, 1)=50, E(1, 0)=50, and E(1, 1)=50), the average value (40) is obtained. Here, a symbol * has nothing to do with the foregoing value. It is only for drawing attention (the same applies to the following), and its reason will become clear in the following description.

(B) Next, a new set {30*, −10, −10, −10} is obtained by subtracting the error values (10*, 50, 50, 50) from the average value (40).

(C) Then, from the new set, the standard deviation is obtained. Calculating step by step will give 30×30+10×10+10×10+10×10=1200 and 1200/4=300, and thus the standard deviation becomes $\sqrt{300}=10\sqrt{3}$=about 17. Then, dividing the elements of the new set by 17, the quotients (1*, −1, −1, −1) are obtained.

(D) After that, the maximum value in the values obtained is made a matching degree (1*). The value 1* is a value corresponding to the value E (0, 0)=10*. E(0, 0) is a value satisfying E(0, 0)=min{E(i, j)} at this time.

<Conceptual Description of Matching Degree Deciding Method>

The processing in the deciding method of the matching degree calculates, after all, the separation of the minimum error value in the plurality of error value sets from the average error value (the foregoing (A) and (B)).

Then, by dividing the degrees of the separation by the standard deviation, the maximum value of them is obtained as the matching degree (the foregoing (C) and (D)).

By comparing the matching degree obtained in this way with the threshold, a matching result can be obtained.

Incidentally, the standard deviation means the average value of "the differences between the error values and the average value". In other words, the standard deviation is a value indicating an approximate level of the dispersion in the set as a whole.

By dividing the degree of the separation by the general dispersion value (standard deviation), it is found how small the min{E(i, j)} is in the set {E(i, j)} (very small or somewhat small).

Then, a decision is made that the matching result is valid when the min{E(i, j)} is markedly small in the set {E(i, j)}, and is invalid in the remaining cases (E).

<Reason for Making Decision that Matching Result is Valid Only when Min{E(i, j)} is Particularly Small in Set {E(i, i)}>

Here, assume that the registered paper fingerprint information and the paper fingerprint information obtained just now are obtained from the one and the same paper.

In this case, there must be a position at which the registered paper fingerprint information agrees very much with the paper fingerprint information obtained just now (the position relates to the foregoing positional discrepancy, and the position is referred to as a displaced position). In this case, at the displaced position, since the registered paper fingerprint information and the paper fingerprint information obtained just now agree with one another very much, E(i, j) must be very small.

On the other hand, if they are shifted from the displaced position even slightly, the registered paper fingerprint information loses its relation with the paper fingerprint information obtained just now. Accordingly, it is expected that E(i, j) becomes very large in general.

Therefore the condition that "the two pieces of the paper fingerprint information are obtained from the one and the same paper" agrees with the condition that "the minimum E(i, j), that is, the min{E(i, j)} is markedly small in the set {E(i, j)}".

Here, the subject is returned to <Paper fingerprint Information Matching Processing>.

At step 1003, the matching degree between the two pieces of the paper fingerprint information obtained at step 1002 is compared with the prescribed threshold to decide the validity of the paper fingerprint information obtained just now. Here, the matching degree is sometimes referred to as the "degree of similarity". In addition, the matching result of the matching degree with the prescribed threshold is referred to as a "matching result".

The foregoing was the description of the controller 11.

<Description of Operating Screen>

Next, the operating screen in the image forming apparatus 10 will be described.

Figure 15:
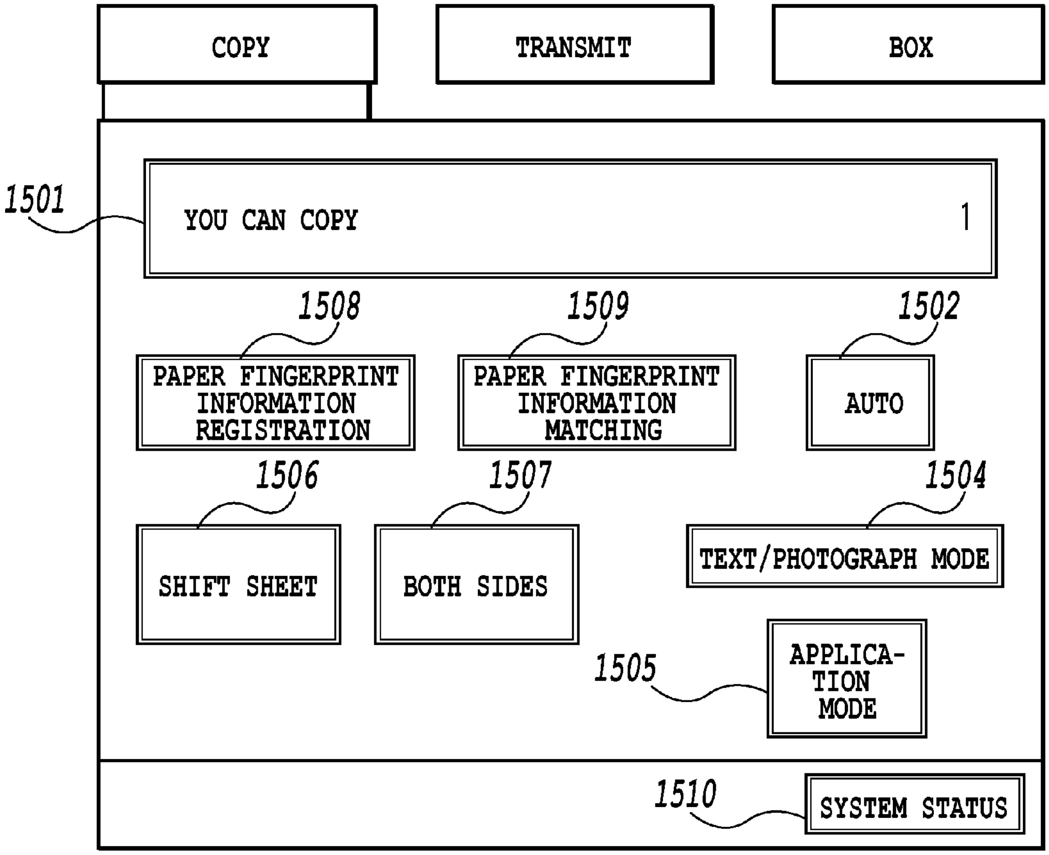
FIG. 15 is a diagram showing an example of an initial screen of the operating section of the first embodiment in accordance with the present invention.

FIG. 15 shows an initial screen of the operating section 12 in the image forming apparatus 10.

A region 1501 indicates whether the image forming apparatus 10 is in a state capable of copying or not, and the number of copies set ("1" in FIG. 15). A source document selecting tab 1504 is a tab for selecting the type of the source document. Every time the tab is pressed, one of the three selecting menus of the text, photographic and text/photograph is displayed in a pop-up manner. A finishing tab 1506 is a tab for carrying out settings associated with various types of finishing. A duplex (both sides) setting tab 1507 is a tab for carrying out settings associated with duplex reading and duplex printing.

A reading mode tab 1502 is a tab for selecting a reading mode of the source document. Every time the tab is pressed, one of the three selection menus of color/black/auto (ACS) is displayed in a pop-up manner. When the color is selected, color copying is performed, and when the black is selected, monochrome copying is carried out. In addition, when the ACS is selected, the copy mode is decided according to the monochrome color decision signal described above.

A region 1508 is a tab for selecting the paper fingerprint information registration processing, and a region 1509 is a tab for selecting the paper fingerprint information Matching processing. As to the paper fingerprint information registration processing and the paper fingerprint information matching processing in response to the operation of the tab, they will be described later.

A region 1510 is a tab for indicating system status. When the tab is pressed, a list of the image data stored in the HDD 304 in the image forming apparatus 10 is displayed on the screen.

<Operation when Paper Fingerprint Information Registration Processing Tab is Pressed (Paper Fingerprint Information Registration Processing at Copying)>

Figure 16:
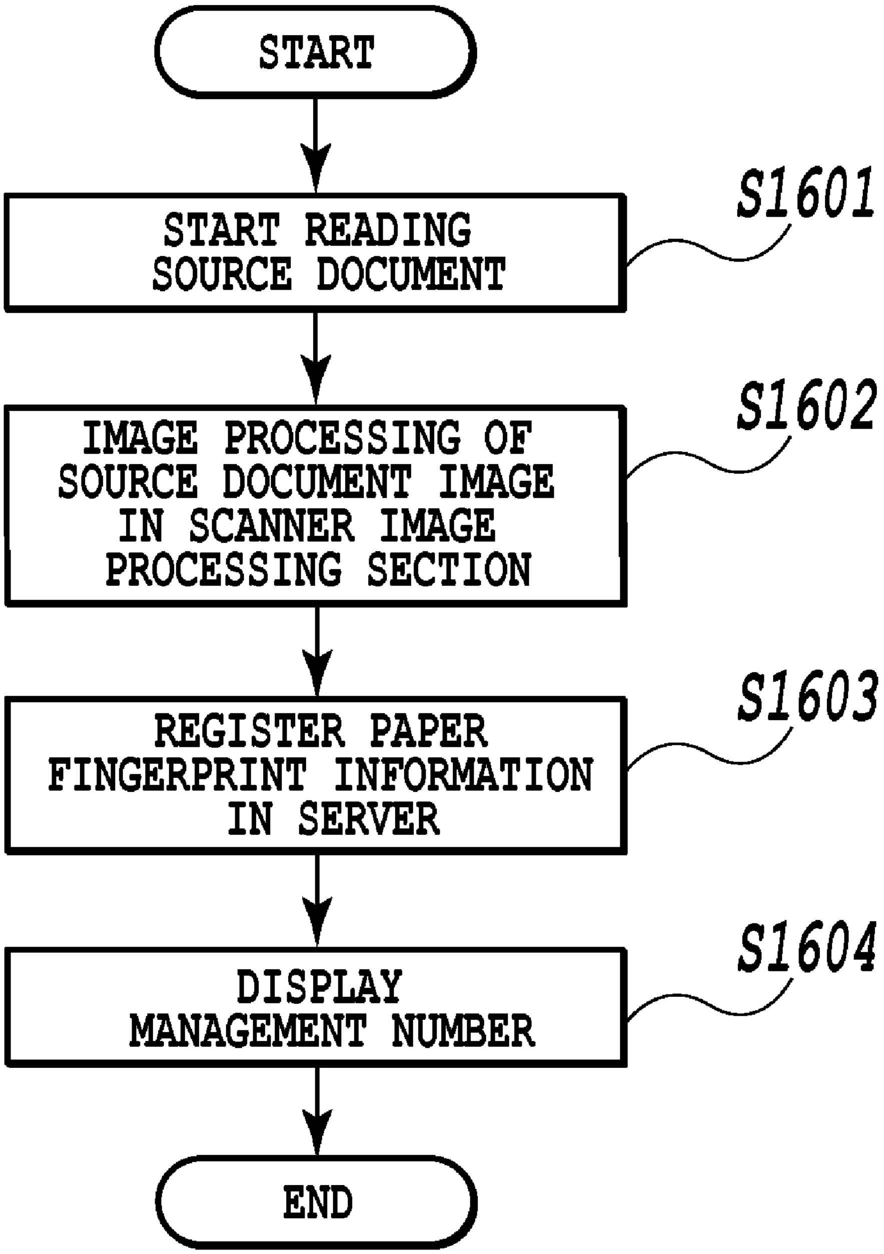
FIG. 16 is a flowchart showing paper fingerprint information registration processing in the first embodiment in accordance with the present invention.

Next, the paper fingerprint information registration processing, which is executed when a user presses a start key after pressing the paper fingerprint information registration tab 1508 shown in FIG. 15, will be described with reference to the flowchart of FIG. 16.

At step 1601, the CPU 301 carries out control in such a manner as to deliver the source document read by the scanner section 13 to the scanner image processing section 312 via the scanner I/F 311 as the image data.

At step 1602, the scanner image processing section 312 sets a gain adjustment value smaller than a normal gain adjustment value to the shading correcting section 500. Then, as described before with reference to FIG. 6, the paper fingerprint information obtaining section 507 obtains the paper fingerprint information from the individual luminance signal values obtained by applying the small gain adjustment value to the image data. Thus, it delivers the obtained paper fingerprint information to the RAM 302 via a data bus not shown.

It is essential for the paper fingerprint obtaining technique to obtain rather dark image data since the technique obtains fiber patterns from white region. Accordingly, the present embodiment obtains the dark image data for obtaining the paper fingerprint information by the scanner image processing section 312 by setting the gain adjustment value smaller than the normal gain adjustment value. However, the method of obtaining the dark image data is not limited to the foregoing method. For example, such a method is also conceivable which scans while reducing the quantity of light.

At step 1603, the CPU 301 has the server issue a management number, and registers the management number, the paper fingerprint information and the information on the paper fingerprint information acquiring region in the server while establishing correspondences between them. Here, the term "information on the paper fingerprint information acquiring region" refers to the information on the position where the paper fingerprint information is obtained.

At step 1604, the CPU 301 controls in such a manner as to display the management number on the display screen.

<Operation when Paper Fingerprint Information Matching Processing Tab is Pressed>

Figure 17:
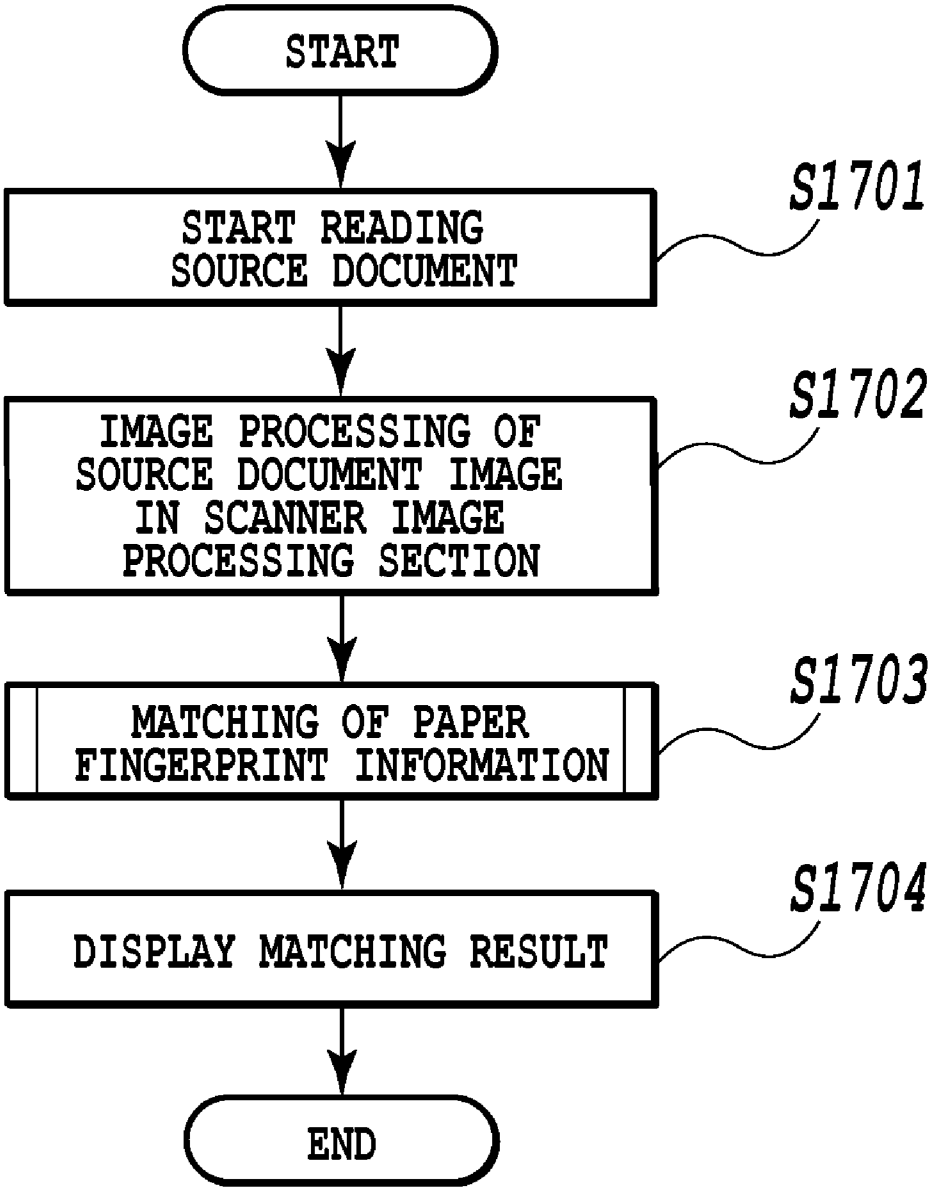
FIG. 17 is a flowchart showing paper fingerprint information matching processing in the first embodiment in accordance with the present invention.

Next, the operation at the time when the user presses the paper fingerprint information matching tab 1509 shown in FIG. 7, followed by inputting the management number and by pressing the start key, will be described with reference to FIG. 17.

At step 1701, the CPU 301 controls in such a manner as to deliver the source document read by the scanner section 13 to the scanner image processing section 312 via the scanner I/F 311 as the image data.

At step 1702, the scanner image processing section 312 performs the processing shown in FIG. 5 on the image data to generate the new image data and attribute data. In addition, it attaches the attribute data to the image data.

Furthermore, at step 1702, the CPU 301 decides the paper fingerprint information acquiring region on the basis of the input management number. As described above, since the server records the management number, the paper fingerprint information and the information on the paper fingerprint information acquiring region while establishing correspondences between them, the paper fingerprint information acquiring region is identified by the management number. Subsequently, the paper fingerprint information obtaining section 507 in the scanner image processing section 312 obtains the paper fingerprint information from the paper fingerprint information acquiring region decided above. Then, it delivers the paper fingerprint information obtained to the RAM 302 via the data bus not shown.

In addition, at the same step 1702, it obtains the paper fingerprint information registered in the server in connection with the input management number. Then, it delivers the information obtained to the RAM 302 via the data bus not shown.

At step 1703, the CPU 301 cross-checks the paper fingerprint information registered in the server with the paper fingerprint information obtained by the paper fingerprint information obtaining section 507. As for the matching processing, it is the same as described above in the foregoing <Paper fingerprint Information Matching Processing> with reference to FIG. 9.

At step 1704, the CPU 301 controls in such a manner as to display the result (valid or invalid) obtained in the <Paper fingerprint Information Matching Processing> on the display screen of the operating section 12.

The foregoing was the description of the first embodiment in accordance with the present invention.

Second Embodiment

Next, a second embodiment in accordance with the present invention will be described.

To make the matching of the paper fingerprint information, and to enable the copy only when a decision of "valid" is made as a result of the matching, the present system carries out reading while reducing the gain of the scanner to obtain the paper fingerprint information. In other words, it carries out reading while converting the values of the electric signal obtained by exposing and scanning the source document to low luminance signal values. Then, after obtaining the paper fingerprint information, it returns the gain to the normal gain for copying. Thus, it requires the scanning twice. In view of this, the present embodiment offers an example that enables copying with only a single scanning without reducing the gain of the scanner even in such a case.

The information which the present embodiment uses for the matching of the document is not the paper fingerprint information, but unique information on the print paper surface brought about by irregular dispersion of the toner at printing (print paper surface unique information).

To obtain the unique information produced on the print paper surface such as the dispersion of the toner, the present embodiment performs printing while applying light gray on part or all over the paper surface when printing and outputting a document to be registered for authenticity verification. As for the irregular dispersion of the toner adhering to the paper surface, normal scanning can read it without reducing the gain of the scanner or the quantity of light of the scanner.

Thus, single reading at copying can enable the matching of the print paper surface unique information as well as the copying. In addition, since the random dispersion of the toner can increase the variance of the gradation values of the pixels as compared with the paper fingerprint information due to the unevenness of the paper itself or the overlap of fibers, it can increase the difference as compared with other different paper fingerprint information, thereby offering an advantage of being able to increase the matching accuracy.

Incidentally, as for the processing of the registration and matching of the print paper surface unique information, it can be executed in the same manner as the processing of the registration and matching of the paper fingerprint information in the first embodiment by handling the print paper surface unique information in the same manner as the paper fingerprint information.

Third Embodiment

Next, a third embodiment in accordance with the present invention will be described.

Although the print paper surface unique information used in the second embodiment can increase the matching accuracy as compared with the paper fingerprint information, the second embodiment is unapplicable to an existing document because it is impossible to carry out printing while applying light gray to part or all over the paper surface of the existing original.

In view of this, the present embodiment describes an example that searches for a region more suitable for the authenticity verification between the two pieces of information consisting of the paper fingerprint information and the print paper surface unique information.

From the reading of the image on the paper surface up to the generation and decision of the histogram, the same means and processing as those of the foregoing first embodiment are applicable. Then, from a region on which a decision is made that the paper is pure white from the generated histogram, it is possible to read the paper fingerprint information by converting the values of the electric signal obtained by exposing and scanning the source document to the low luminance signal values. On the other hand, from a region on which a decision is made that a light background is placed on the paper, it is possible to obtain the print paper surface unique information without altering the luminance values.

Incidentally, as for the processing of the registration and matching of the paper fingerprint information or the print paper surface unique information in the present embodiment, it can be executed in the same manner as the processing of the registration and matching of the paper fingerprint information in the first embodiment even in the case of using the print paper surface unique information by handling it in the same manner as the paper fingerprint information.

Thus, it is possible even for the existing document to use for the matching a region more appropriate for the authenticity verification.

Other Embodiments

Furthermore, the present invention is applicable not only to a system consisting of a plurality of devises (such as a computer, an interface unit, a reader and a printer) but also to an apparatus consisting of a single device (such as a multifunction machine, a printer and a fax machine).

In addition, the object of the present invention can be achieved by reading program code from a storage medium that stores the program code for implementing the procedures of the flowcharts shown in the embodiments described above, and by executing the program code with a computer. In this case, the program code itself read from the storage medium implements the functions of the foregoing embodiments. Accordingly, the program code and the computer readable storage medium that stores the program code constitute the present invention.

As the storage medium for supplying the program code, a floppy disk, hard disk, optical disk, magneto-optical disk, CD-ROM, CD-R, magnetic tape, nonvolatile memory card, ROM and the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-242666, filed Sep. 19, 2007, which is hereby incorporated by reference herein in its entirety.

What is claimed is:

1. An image processing apparatus comprising:

region dividing means for dividing image data including a read out paper fingerprint into a plurality of regions;

means for obtaining variance of gradation values of pixels in individual regions divided by the region dividing means;

deciding means for making a decision based on each variance value obtained by the means for obtaining variance of gradation values as to whether a corresponding region is suitable for matching of the paper fingerprint information; and extracting means for extracting the paper fingerprint information in the region that said deciding means decides is suitable.

2. The image processing apparatus as claimed in claim 1, wherein the means for obtaining variance of gradation values obtains histograms of the individual regions divided by the region dividing means.

3. The image processing apparatus as claimed in claim 1, wherein when obtaining the variance, the means for obtaining variance of gradation values stops obtaining the variance of a region when it makes a decision that in the regions divided by the region dividing means, the region is unsuitable for paper fingerprint information matching because the region includes a greater number of pixels than a prescribed threshold, the pixels having gradation values equal to or lower than a gradation value unsuitable for the paper fingerprint information matching.

4. The image processing apparatus as claimed in claim 1, wherein when obtaining the variance, the means for obtaining variance of gradation values stops obtaining the variance of a region when it makes a decision that in the regions divided by the region dividing means, the region is unsuitable for paper fingerprint information matching because the region includes pixels having gradation values equal to or higher than a gradation value unsuitable for the paper fingerprint information matching.

5. The image processing apparatus as claimed in claim 1, wherein the deciding means makes a decision that in the regions divided by the region dividing means, a region having a greater variance value is more suitable for the matching of the paper fingerprint information.

6. An image processing apparatus comprising:

region dividing means for dividing, into a plurality of regions, image data including read out unique information due to irregular dispersion of toner formed on a print paper surface;

means for obtaining variance of gradation values of pixels in individual regions divided by the region dividing means;

deciding means for making a decision based on each variance value obtained by the means for obtaining variance of gradation values as to whether a corresponding region is suitable for matching of the unique information; and extracting means for extracting the unique information in the region that said deciding means decides is suitable.

7. An image processing apparatus comprising:

region dividing means for dividing, into a plurality of regions, image data including at least one of read out paper fingerprint information and unique information due to irregular dispersion of toner on a printer paper surface;

means for obtaining variance of gradation values of pixels in the individual regions divided by the region dividing means;

deciding means for making a decision based on each variance value obtained by the means for obtaining variance of gradation values as to whether a corresponding region is suitable for matching of the at least one of the paper fingerprint information and the unique information; and extracting means for extracting the at least one of the paper fingerprint information and the unique information in the region that said deciding means decides is suitable.

8. An image processing method using a processing apparatus to perform the steps of:

dividing image data including a read out paper fingerprint into a plurality of regions;

obtaining variance of gradation values of pixels in the individual regions divided in the step of dividing;

making a decision based on each variance value obtained in the step of obtaining variance of gradation values as to whether a corresponding region is suitable for matching of the paper fingerprint information; and extracting the paper fingerprint information in the region decided to be suitable in the step of deciding.

9. An image processing method using a processing apparatus to perform the steps of:

dividing, into a plurality of regions, an image including read out unique information due to irregular dispersion of toner on a print paper surface;

obtaining variance of gradation values of pixels in the individual regions divided in the step of dividing;

making a decision based on each variance value obtained in the step of obtaining variance of the gradation values as to whether a corresponding region is suitable for matching of the unique information; and extracting the unique information in the region decided to be suitable in the step of deciding.

10. An image processing method using a process apparatus to perform the steps of:

dividing, into a plurality of regions, an image including at least one of read out paper fingerprint information and unique information due to irregular toner dispersion on a print paper surface;

obtaining variance of gradation values of pixels in individual regions divided in the step of dividing;

making a decision based on each variance value obtained in the step of obtaining variance of the gradation values as to whether a corresponding region is suitable for matching of the at least one of the paper fingerprint information and the unique information; and extracting the at least one of the paper fingerprint information and the unique information in the region decided to be suitable in the step of deciding.

11. A computer readable storage medium which stores a program for causing a computer to execute the steps of:

dividing image data including a read out paper fingerprint into a plurality of regions;

obtaining variance of gradation values of pixels in individual regions divided in the step of dividing;

making a decision based on each variance value obtained in the step of obtaining variance of gradation values as to whether a corresponding region is suitable for matching of the paper fingerprint information; and extracting the paper fingerprint information in the region decided to be suitable in the step of deciding.

* * * * *